(12) United States Patent
Shin et al.

(10) Patent No.: US 11,412,552 B2
(45) Date of Patent: *Aug. 9, 2022

(54) METHOD AND APPARATUS FOR TRANSMITTING A RANDOM ACCESS PREAMBLE IN A NARROW BAND IOT SYSTEM SUPPORTING TIME DIVISION DUPLEXING

(71) Applicant: LG Electronics Inc., Seoul (KR)

(72) Inventors: Seokmin Shin, Seoul (KR); Changhwan Park, Seoul (KR); Seonwook Kim, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 128 days.

This patent is subject to a terminal disclaimer.

(21) Appl. No.: 16/897,473

(22) Filed: Jun. 10, 2020

(65) Prior Publication Data

US 2020/0359414 A1 Nov. 12, 2020

Related U.S. Application Data

(63) Continuation of application No. 16/190,952, filed on Nov. 14, 2018, now Pat. No. 10,721,777.

(30) Foreign Application Priority Data

Nov. 14, 2018 (KR) .................. 10-2018-0139896

(51) Int. Cl.
*H04W 74/08* (2009.01)
*H04L 27/26* (2006.01)
(Continued)

(52) U.S. Cl.
CPC .......... *H04W 74/085* (2013.01); *H04L 5/14* (2013.01); *H04L 5/1469* (2013.01);
(Continued)

(58) Field of Classification Search
None
See application file for complete search history.

(56) References Cited

U.S. PATENT DOCUMENTS 9,164,635 B2 10/2015 Nam
9,774,983 B2 9/2017 Li et al.
(Continued)

FOREIGN PATENT DOCUMENTS

WO WO2016208897 12/2016

OTHER PUBLICATIONS

U.S. Appl. No. 62/564,542, filed Sep. 28, 2017, "NPRACH Formats for NP-IOT Transmissions in TDD mode", Lin et al.*
(Continued)

*Primary Examiner* — Gregory B Sefcheck
(74) *Attorney, Agent, or Firm* — Fish & Richardson P.C.

(57) ABSTRACT

A method for transmitting a random access preamble in a narrowband-IoT system supporting time division duplexing and an apparatus therefor. In some implementations, a method for transmitting a narrowband physical random access channel (NPRACH) preamble by a user equipment in a narrowband-Internet of things (NB-IoT) system supporting time division duplexing may include: receiving, from a base station, configuration information related to an uplink-downlink configuration; and transmitting, to the base station, the NPRACH preamble configured by considering the uplink-downlink configuration.

17 Claims, 30 Drawing Sheets

Related U.S. Application Data

(60) Provisional application No. 62/621,574, filed on Jan. 24, 2018, provisional application No. 62/587,460, filed on Nov. 16, 2017, provisional application No. 62/586,123, filed on Nov. 14, 2017.

(51) Int. Cl.

| | | |
|---|---|---|
| *H04L 5/14* | (2006.01) | |
| *H04L 27/00* | (2006.01) | |
| *H04W 74/00* | (2009.01) | |
| *H04L 5/00* | (2006.01) | |

(52) U.S. Cl.
CPC ........ *H04L 27/0014* (2013.01); *H04L 27/261* (2013.01); *H04L 27/2607* (2013.01); *H04L 27/2678* (2013.01); *H04W 74/006* (2013.01); *H04L 5/0012* (2013.01); *H04L 2027/0095* (2013.01)

(56) References Cited

U.S. PATENT DOCUMENTS

| | | | |
|---|---|---|---|
| 9,853,851 B2 | 12/2017 | Simon et al. | |
| 10,362,573 B2* | 7/2019 | Halabian | H04L 27/2602 |
| 10,367,620 B2 | 7/2019 | Iyer et al. | |
| 10,389,496 B2 | 8/2019 | Hwang et al. | |
| 10,454,657 B2 | 10/2019 | Bhattad et al. | |
| 10,454,658 B2 | 10/2019 | Bhattad et al. | |
| 10,630,410 B2* | 4/2020 | Parkvall | H04L 29/06231 |
| 10,701,671 B2* | 6/2020 | Bhattad | H04W 72/0446 |
| 10,721,777 B2* | 7/2020 | Shin | H04L 27/261 |
| 10,736,099 B2* | 8/2020 | Lee | H04W 72/005 |
| 2011/0122967 A1 | 5/2011 | Wiberg | |
| 2015/0003303 A1 | 1/2015 | Astely et al. | |
| 2015/0326995 A1 | 11/2015 | Li et al. | |
| 2016/0192333 A1 | 6/2016 | Wang et al. | |
| 2017/0324587 A1 | 11/2017 | Lin et al. | |
| 2017/0366311 A1 | 12/2017 | Iyer et al. | |
| 2018/0145802 A1 | 5/2018 | Hwang et al. | |
| 2018/0241535 A1 | 8/2018 | Chen et al. | |
| 2018/0248672 A1* | 8/2018 | Bhattad | H04L 5/0092 |
| 2019/0021118 A1* | 1/2019 | Tishbi | H04L 27/0006 |
| 2019/0052422 A1 | 2/2019 | Yin et al. | |
| 2019/0075602 A1 | 3/2019 | Lin et al. | |
| 2020/0178296 A1* | 6/2020 | Shin | H04L 5/1469 |
| 2020/0187197 A1* | 6/2020 | Chen | H04W 56/001 |
| 2020/0245363 A1* | 7/2020 | Kim | H04B 1/713 |
| 2020/0245365 A1* | 7/2020 | Lin | H04L 5/1469 |

OTHER PUBLICATIONS

JP Office Action in Japanese Appln. No. 2020-502193, dated Apr. 13, 2021, 3 pages (with English translation).

Ericsson, "On the UL of NB-IoT TDD," R1-1717022, 3GPP TSG-RAN WG1 Meeting #90bis, Prague, Czech Republic, Oct. 9-13, 2017, 14 pages.

Extended European Search Report in European Appln. No. 18878584.4, dated Sep. 14, 2020, 6 pages.

Qualcomm Incorporated, "Uplink aspects of TDD," R1-1718147, 3GPP TSG-RAN WG1 #90bis, Prague, Czechia, Oct. 9-13, 2017, 4 pages.

C. Yu, L. Yu, Y. Wu, Y. He and Q. Lu, "Uplink Scheduling and Link Adaptation for Narrowband Internet of Things Systems," in IEEE Access, vol. 5, pp. 1724-1734, 2017.

Cewit, "NPRACH design aspects for the support of TDD NB-IoT," R1-1717712, 3GPP TSG-RAN WG1 #90b, Prague, Czechia, dated Sep. 29, 2017, 7 pages.

Cewit, 'NP RACH design aspects for the support of TDD NB-IoT', R 1-1717712, 3GPP TSG-RAN WG1 #90b, Prague, Czechia, Sep. 29, 2017. See pp. 3, 5. (Year: 2017).

Iith, "NPRACH design for NB-IoT TDD," R1-1717987, 3GPP TSG RAN WG1 Meeting RAN1#90-Bis, Prague, CZ, dated Sep. 29, 2017, 8 pages.

Iith, 'NPRACH design for NB-IoT TDD', R1-1717987, 3GPP TSG RAN WG1 Meeting RAN1#90-Bis, Prague, CZ, Sep. 29, 2017. See section 3. (Year: 2017).

J. Zou, H. Yu, W. Miao and C. Jiang, "Packet-Based Preamble Design for Random Access in Massive IoT Communication Systems," in IEEE Access, vol. 5, pp. 11759-11767, 2017.

LG Electronics, "Preamble structure for NPRACH enhancement," R1- 1717285, 3GPP TSG RAN WG1 Meeting #90bis, Prague, Czech Republic, dated Sep. 29, 2017, 6 pages.

LG Electronics, 'Preamble structure for NPRACH enhancement', R1-1717285 (Revision of R1-1713105), 3GPP TSG RAN WG1 Meeting #90bis, Prague, Czech Republic, Sep. 29, 2017. See section 2. (Year: 2017).

M. Chen, Y. Miao, Y. Hao and K. Hwang, "Narrow Band Internet of Things," in IEEE Access, vol. 5, pp. 20557-20577, 2017.

U.S. Appl. No. 62/543,757, filed Aug. 10, 2017, Yin et al., Slot Structure of Long Physical Uplink Control Channel (PUCCH) Design for 5th Generation (5G) New Radio (NR).

W. Yang et al., "Enhanced System Acquisition for NB-IoT," in IEEE Access, vol. 5, pp. 13179-13191, 2017.

* cited by examiner

FIG. 5A  SINGLE CC

FIG. 5B  MULTIPLE CCS

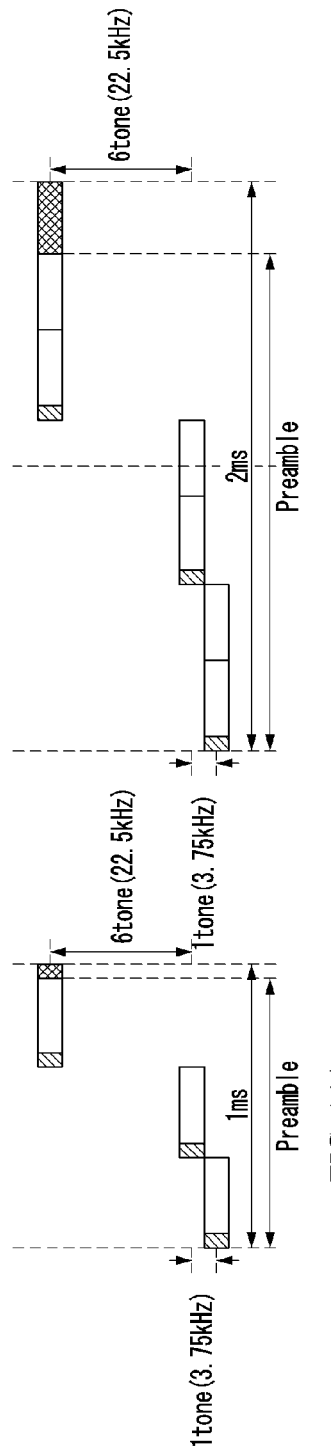
FIG. 14A
FIG. 14B
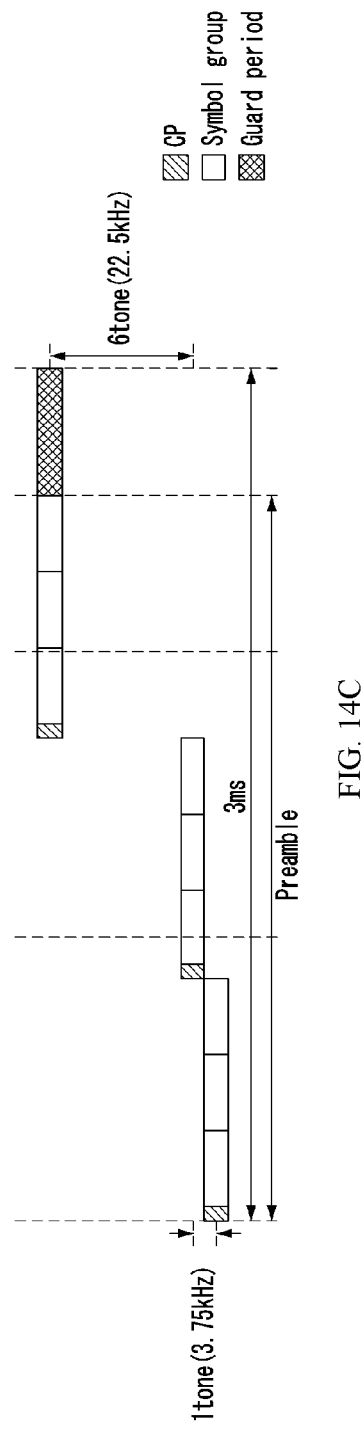
FIG. 14C

METHOD AND APPARATUS FOR TRANSMITTING A RANDOM ACCESS PREAMBLE IN A NARROW BAND IOT SYSTEM SUPPORTING TIME DIVISION DUPLEXING

CROSS-REFERENCE TO RELATED APPLICATIONS

This application is a continuation application of U.S. patent application Ser. No. 16/190,952, filed Nov. 14, 2018 and issued as U.S. Pat. No. 10,721,777 on Jul. 21, 2020, which claims the benefit of earlier filing date and right of priority to U.S. Provisional Application No. 62/586,123, filed on Nov. 14, 2017, U.S. Provisional Application No. 62/587,460, filed on Nov. 16, 2017, U.S. Provisional Application No. 62/621,574, filed on Jan. 24, 2018, and KR Application No. 10-2018-0139896, filed on Nov. 14, 2018. The contents of which are incorporated by reference herein in their entirety.

TECHNICAL FIELD

The present invention relates to a narrowband IoT system, and more particularly, to a method for transmitting a random access preamble in a narrowband IoT system supporting time division duplexing and an apparatus therefor.

BACKGROUND

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

The present invention provides a random access preamble configuring method for transferring a random access preamble by considering an uplink/downlink configuration (UL/DL configuration) configured in a system in a case where time division duplexing (TDD) is supported in a Narrowband-IoT (NB-IOT) system.

The technical objects of the present invention are not limited to the aforementioned technical objects, and other technical objects, which are not mentioned above, will be apparently appreciated by a person having ordinary skill in the art from the following description.

In an aspect, provided is a method for transmitting a narrowband physical random access channel (NPRACH) preamble by a user equipment in a narrowband-Internet of things (NB-IoT) system supporting time division duplexing, which includes: receiving, from a base station, configuration information related to an uplink-downlink configuration; and transmitting, to the base station, the NPRACH preamble configured by considering the uplink-downlink configuration, in which the NPRACH preamble may include two symbol group sets and the symbol group set may include three contiguous symbol groups, and a length of the symbol group set may be configured to be shorter than a transmission time unit in the NB-IoT system.

Further, in the method performed by the UE according to the embodiment of the present invention, the symbol group may include one cyclic prefix and one symbol.

Further, in the method performed by the UE according to the embodiment of the present invention, the uplink-downlink configuration may be configured based on frame structure type 2 related to the time division duplexing.

Further, in the method performed by the UE according to the embodiment of the present invention, the transmission time unit may be a subframe based on the frame structure type 2.

Further, in the method performed by the UE according to the embodiment of the present invention, the three contiguous symbol groups may be transmitted through first frequency hopping and second frequency hopping.

Further, in the method performed by the UE according to the embodiment of the present invention, a value of the second frequency hopping may be six times the value of the first frequency hopping.

Further, in the method performed by the UE according to the embodiment of the present invention, the number of symbol group sets included in the NPRACH preamble, the number of symbol groups included in the symbol group set, and the number of symbols included in the symbol group may be configured differently according to the uplink-downlink configuration supported by the base station.

In another aspect, provided is a method for receiving a narrowband physical random access channel (NPRACH) preamble by a base station in a narrowband-Internet of things (NB-IoT) system supporting time division duplexing, which includes: receiving, from a base station, configuration information related to an uplink-downlink configuration; and receiving, from the user equipment, the NPRACH preamble configured by considering the uplink-downlink configuration, in which the NPRACH preamble may include two symbol group sets and the symbol group set may include three contiguous symbol groups, and a length of the symbol group set may be configured to be shorter than a transmission time unit in the NB-IoT system.

Further, in the method performed by the base station according to the embodiment of the present invention, the symbol group may include one cyclic prefix and one symbol.

Further, in the method performed by the base station according to the embodiment of the present invention, the uplink-downlink configuration may be configured based on frame structure type 2 related to the time division duplexing.

Further, in the method performed by the base station according to the embodiment of the present invention, the transmission time unit may be a subframe based on the frame structure type 2.

In yet another aspect, provided is a user equipment transmitting a narrowband physical random access channel (NPRACH) preamble in a narrowband-Internet of things (NB-IoT) system supporting time division duplexing, which includes: a radio frequency (RF) module transmitting and receiving a radio signal; and a processor controlling the RF module, in which the processor may receive, from a base station, configuration information related to an uplink-downlink configuration, and transmit, to the base station, the NPRACH preamble configured by considering the uplink-downlink configuration, the NPRACH preamble may include two symbol group sets and the symbol group set may include three contiguous symbol groups, and a length of the symbol group set may be configured to be shorter than a transmission time unit in the NB-IoT system.

Further, in the UE according to the embodiment of the present invention, the symbol group may include one cyclic prefix and one symbol.

Further, in the UE according to the embodiment of the present invention, the uplink-downlink configuration may be configured based on frame structure type 2 related to the time division duplexing.

Further, in the UE according to the embodiment of the present invention, the transmission time unit may be a subframe based on the frame structure type 2.

An example is applied to the 3GPP LTE/LTE-A system is described primarily, but it is possible to apply the RRC connection method to various wireless communication systems in addition to the 3GPP LTE/LTE-A system.

In this specification, there is an effect that when supporting the time division duplexing (TDD) in the Narrowband-IoT (NB-IoT) system, the new random access preamble format is defined to use the uplink/downlink configuration (UL/DL configuration) according to the existing LTE system.

Advantages which can be obtained in the present invention are not limited to the aforementioned effects and other unmentioned advantages will be clearly understood by those skilled in the art from the following description.

BRIEF DESCRIPTION OF THE DRAWINGS

The accompanying drawings, which are included herein as a part of the description for help understanding the present invention, provide embodiments of the present invention, and describe the technical features of the present invention with the description below.

FIGS. 14A through 14C illustrate examples of repetitive transmissions of the NPRACH preamble to which the method proposed in this specification may be applied.

DETAILED DESCRIPTION

Figure 1A:
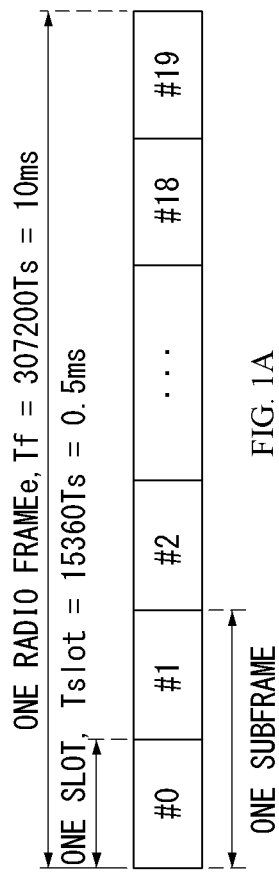
FIGS. 1A and 1B illustrate the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General system to which the present invention may be applied

Figure 1B:
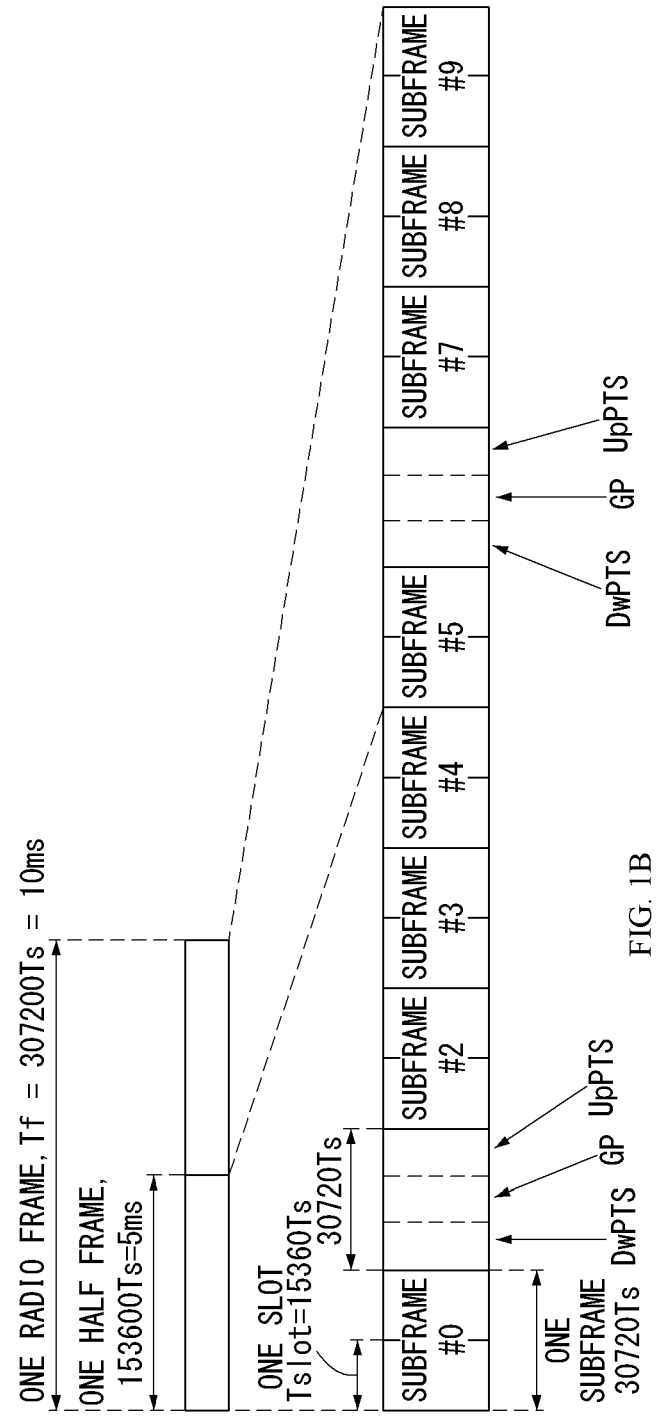

FIGS. 1A and 1B show the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1A exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes contiguous two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

Figure 3:
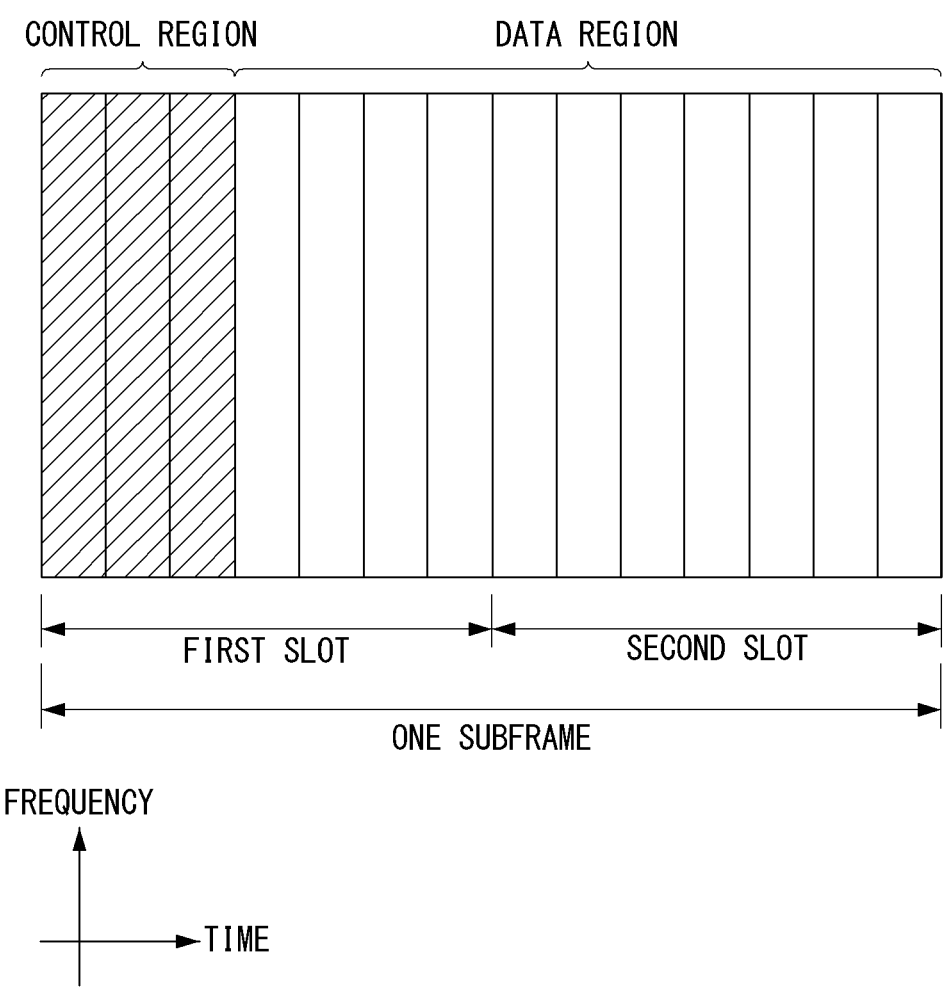
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | | | $7680 \cdot T_s$ | | |
| 1 | $19760 \cdot T_s$ | | | $20480 \cdot T_s$ | $2192 \cdot T_s$ | $2560 \cdot T_s$ |
| 2 | $21952 \cdot T_s$ | $2192 \cdot T_s$ | $2560 \cdot T_s$ | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | | | $20480 \cdot T_s$ | $4384 \cdot T_s$ | $5120 \cdot T_s$ |
| 6 | $19760 \cdot T_s$ | $4384 \cdot T_s$ | $5120 \cdot T_s$ | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIGS. 1A and 1B is just an example, and the number of subcarriers included in a radio frame, the number of slots included in a subframe and the number of OFDM symbols included in a slot may be changed in various manners.

Figure 2:
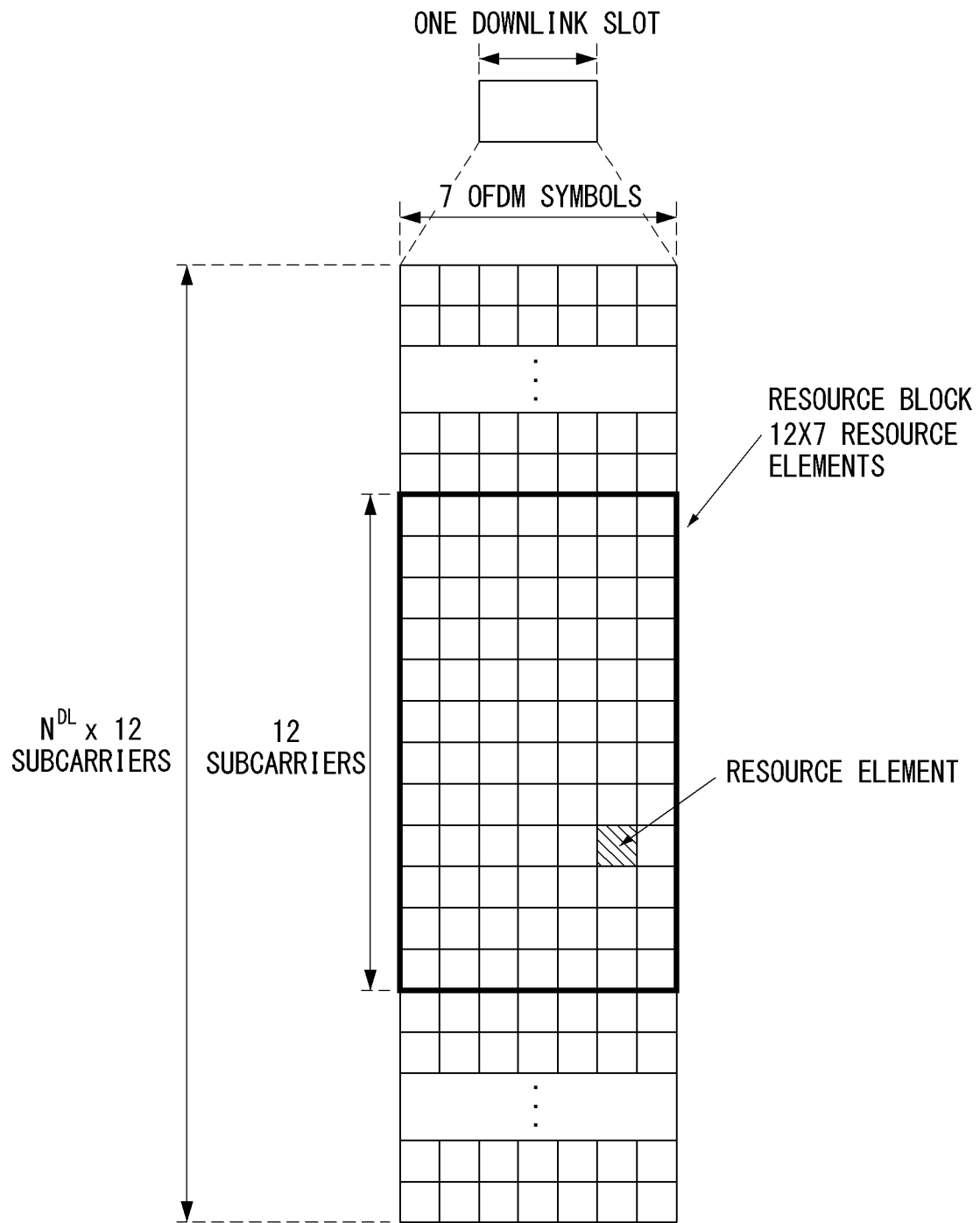
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12·7 resource elements. The number of RBs $N^{DL}$ included in a downlink slot depends on a downlink transmission bandwidth.

The structure of an uplink slot may be the same as that of a downlink slot.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. APDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
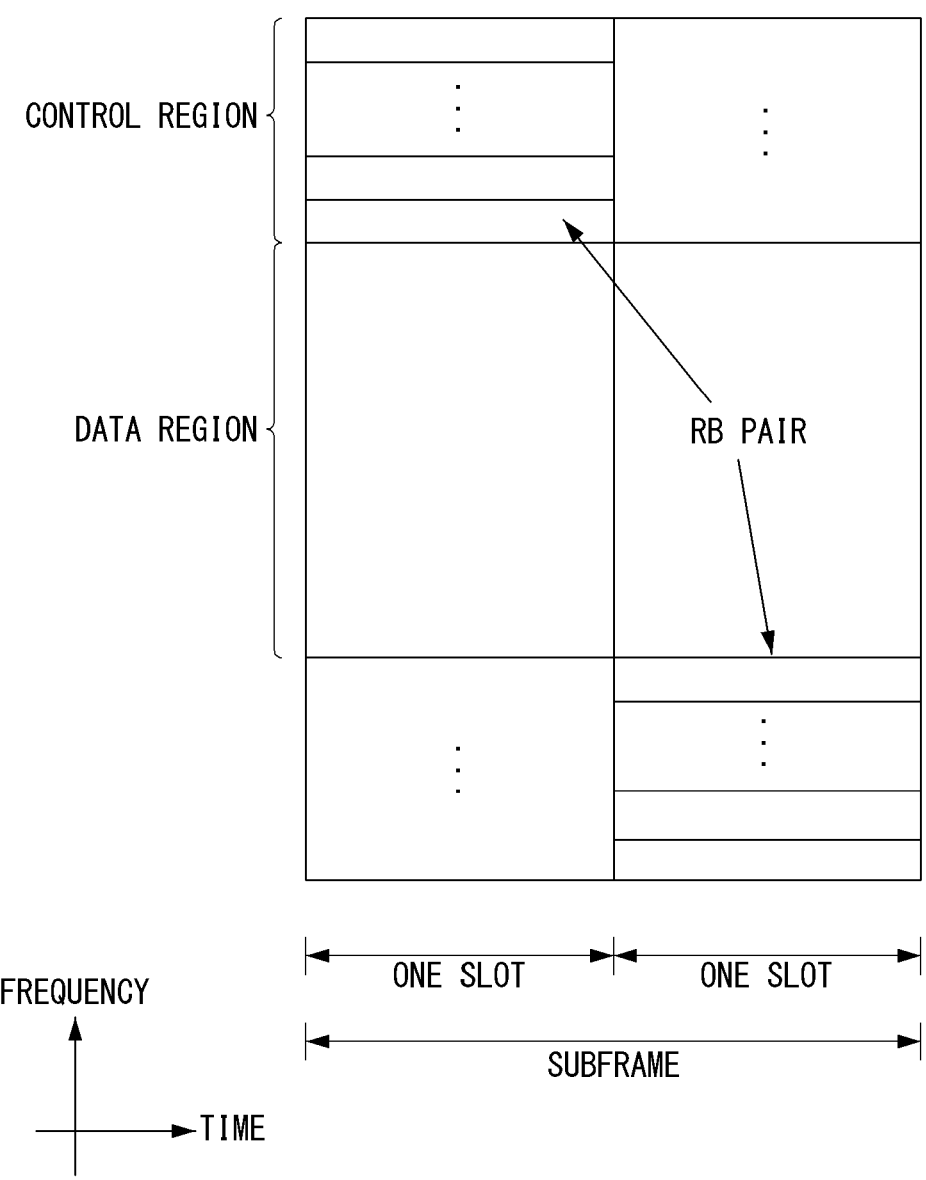
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 5:
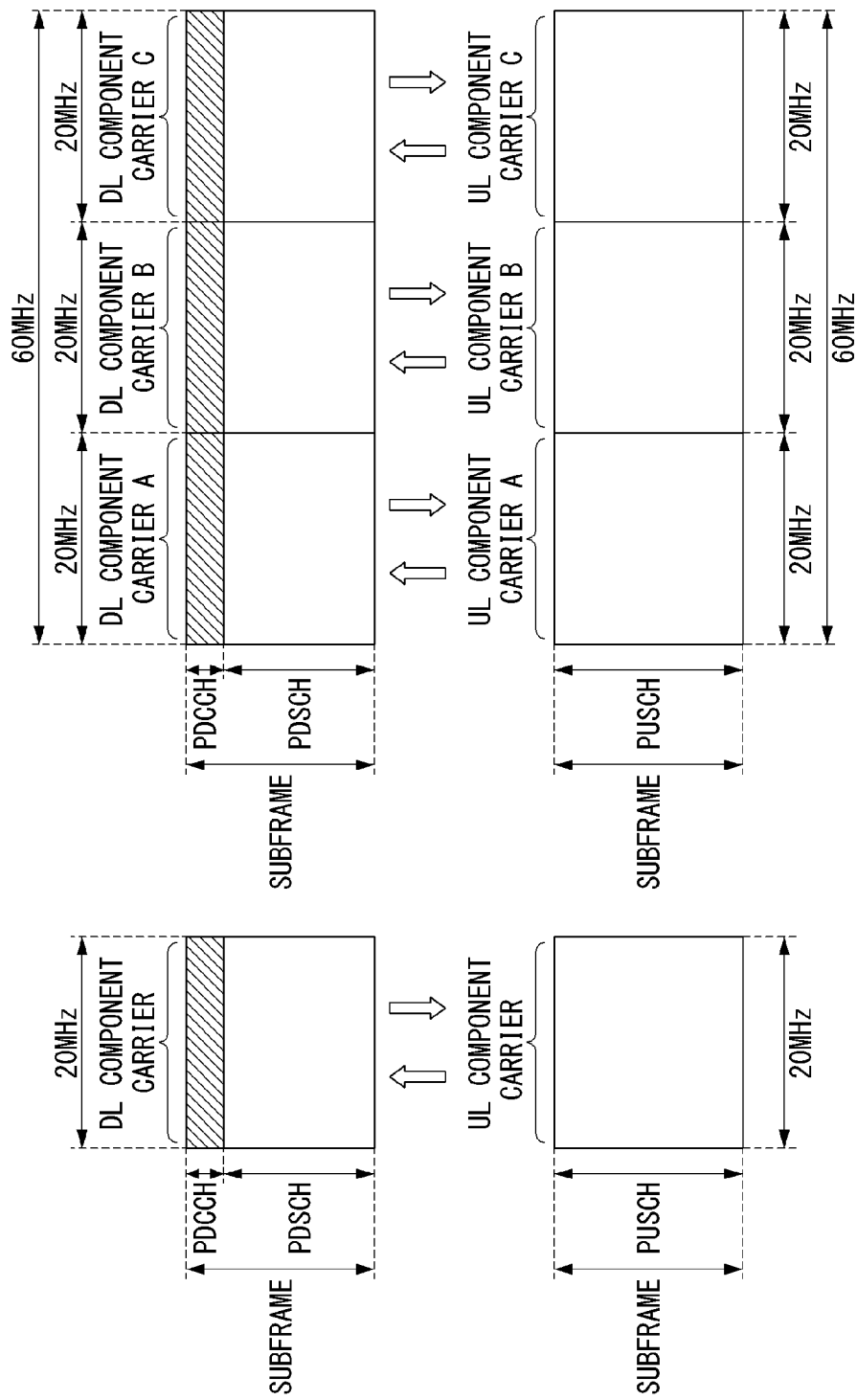
FIGS. 5A and 5B illustrate examples of component carriers and carrier aggregation in a wireless communication system to which the present invention may be applied.

FIGS. 5A and B illustrate examples of a component carrier and carrier aggregation in the wireless communication system to which the present invention can be applied.

FIG. 5A illustrates a single carrier structure used in an LTE system. The component carrier includes the DL CC and the UL CC. One component carrier may have a frequency range of 20 MHz.

FIG. 5B illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Figure 6:
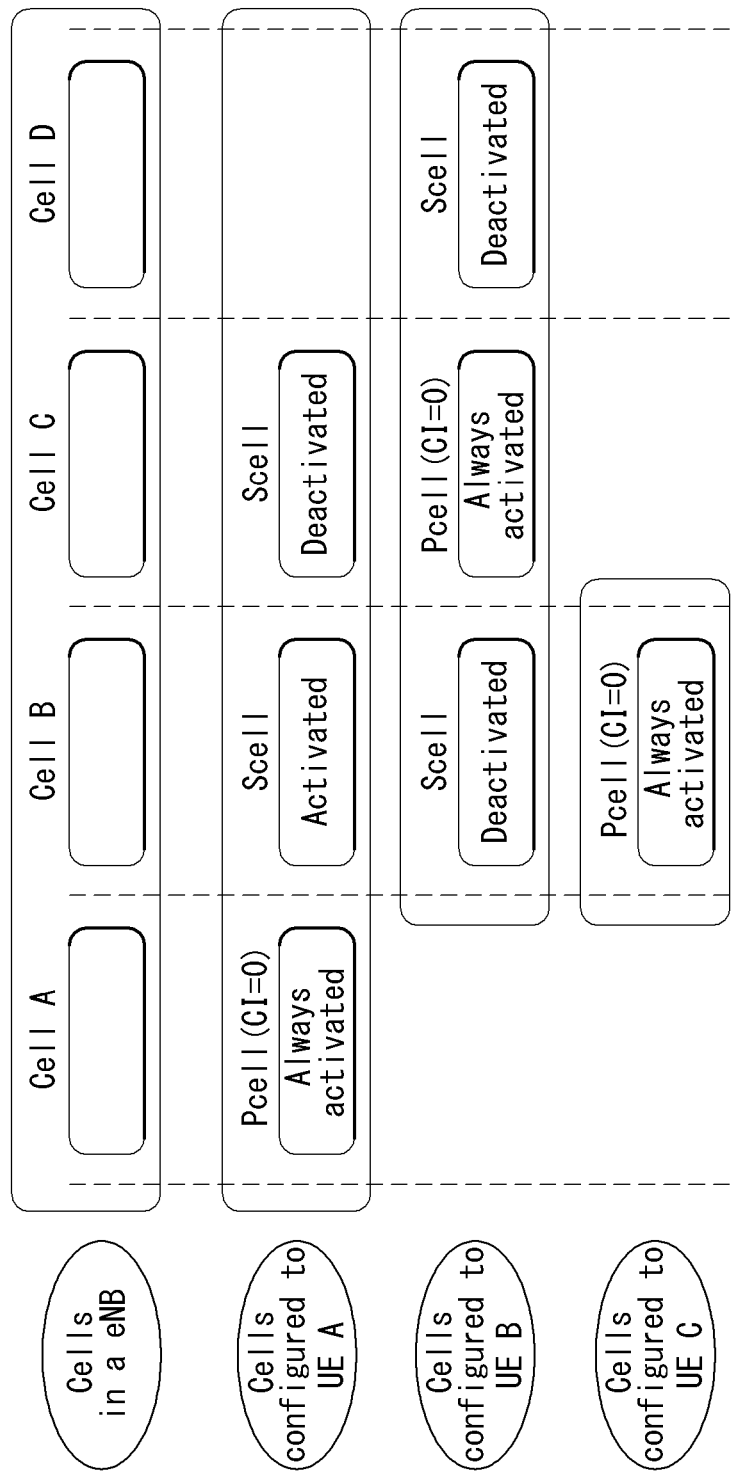
FIG. 6 is a diagram illustrating division of cells in a system that supports the carrier aggregation.

FIG. 6 is a diagram illustrating division of cells in a system that supports the carrier aggregation.

Referring to FIG. 6, a configured cell as a cell that may perform carrier aggregation based on a measurement report among cells of a base station as illustrated in FIGS. 5A and 5B may be configured for each UE. The configured cell may reserve resources for ack/nack transmission for PDSCH transmission in advance. An activated cell as a cell configured to transmit a PDSCH/PUSCH among the configured cells performs Channel State Information (CSI) reporting and (Sounding Reference Signal (SRS) transmission for PDSCH/PUSCH transmission. A de-activated cell as a cell that prevents PDSCH/PUSCH transmission due to a command of the base station or a timer operation may also stop the CSI reporting and the SRS transmission.

Hereinafter, a narrowband physical random access channel will be described.

A physical layer random access preamble is based on single-subcarrier frequency hopping symbol groups.

Figure 7:
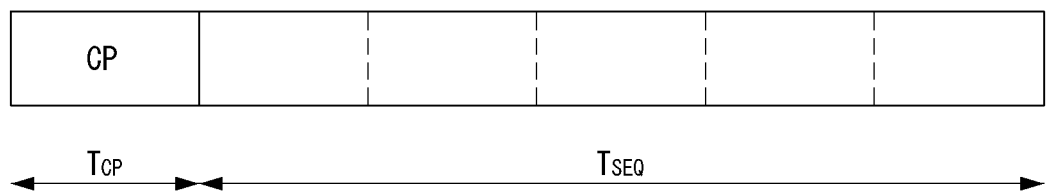
FIG. 7 is a diagram illustrating an example of a symbol group of an NPRACH preamble.

The symbol group is illustrated in FIG. 7 and includes a cyclic prefix (CP) having a length of $T_{CP}$ and a sequence of five identical symbols having an overall length of $T_{SEQ}$.

Parameters of the physical layer random access preamble are listed in Table 3 below.

That is, FIG. 7 is a diagram illustrating an example of a symbol group of the NPRACH preamble and Table 3 illustrates an example of random access preamble parameters.

TABLE 3

| Preamble format | $T_{CP}$ | $T_{SEQ}$ |
| --- | --- | --- |
| 0 | 2048 $T_s$ | 5 · 8192 $T_s$ |
| 1 | 8192 $T_s$ | 5 · 8192 $T_s$ |

An NPRACH preamble including four symbol groups transmitted without gaps is transmitted $N_{rep}^{NPRACH}$ times.

The transmission of the random access preamble, when triggered by an MAC layer, is restricted to specific time and frequency resources.

An NPRACH configuration provided by a higher layer includes the following parameters.

NPRACH resource periodicity, $N_{period}^{NPRACH}$ (nprach-Periodicity),

Frequency position of a first subcarrier allocated to NPRACH, $N_{scoffset}^{NPRACH}$ (nprach-SubcarrierOffset), The number of subcarriers allocated to NPRACH, $N_{sc}^{NPRACH}$ (nprach-NumSubcarriers), The number of starting sub-carriers allocated to contention based NPRACH random access, $N_{sc\_cont}^{NPRACE}$ (nprach-NumCBRA-StartSubcarriers), The number of NPRACH repetitions per attempt, $N_{rep}^{NPRACE}$ (numRepetitionsPerPreambleAttempt), NPRACH starting time, $N_{start}^{NPRACH}$ (nprach-StartTime), Ratio for calculating a starting subcarrier index for an NPRACH subcarrier range reserved for indication of UE support for multi-tone msg3 transmission, $N_{MSG3}^{NPRACH}$ (nprach-SubcarrierMSG3-RangeStart).

The NPRACH transmission may start only in a time unit of $N_{start}^{NPRACH} \cdot 30720\ T_s$ since the start of a radio frame satisfying $n_f\ \mathrm{mod}(N_{period}^{NPRACH}/10)=0$.

4·64 $(T_{CP}+T_{SEQ})$ After transmission of the time unit, a gap of a time unit of 40·30720$T_s$ is inserted.

NPRACH configurations which are $N_{scoffset}^{NPRACH}+N_{sc}^{NPRACH}>N_{sc}^{UL}$ are invalid.

The NPRACH starting subcarriers allocated to the contention based random access are split into two sets of subcarriers, i.e., $\{0, 1, \ldots, Nsc\_cont^{NPRACH}N_{MSG3}^{NPRACH}-1\}$ and $\{N_{sc\_cont}^{NPRACH}N_{MSG3}^{NPRACH}, \ldots, N_{sc\_cont}^{NPRACH}-1\}$. Here, when there is a second set, the second set indicates UE support for the multi-tone msg3 transmission.

The frequency position of the NPRACH transmission is restricted within the subcarriers. Frequency hopping is used in 12 subcarriers, and the frequency position of an i-th symbol group is given by $n_{sc}^{RA}(i)=n_{start}+\tilde{n}_{SC}^{RA}(i)$, $n_{start}=N_{scoffset}^{NPRACH}+\lfloor n_{init}/N_{sc}^{RA} \rfloor \cdot N_{sc}^{RA}$ and follows Equation 1.

$$\tilde{n}_{sc}^{RA}(i) = \qquad \text{[Equation 1]}$$

$$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & \begin{array}{l} i \bmod 4 = 1, 3 \text{ and} \\ \tilde{n}_{sc}^{RA}(i-1) \bmod 2 = 0 \end{array} \\ \tilde{n}_{sc}^{RA}(i-1) - 1 & \begin{array}{l} i \bmod 4 = 1, 3 \text{ and} \\ \tilde{n}_{sc}^{RA}(i-1) \bmod 2 = 1 \end{array} \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n)2^{n-(10t+1)} \right) \right) \bmod (N_{sc}^{RA} - 1) + 1) \bmod N_{sc}^{RA}$$

$$f(-1) = 0$$

Here, $n_{init}$ represents a subcarrier selected from $\{0, 1, \ldots, N_{sc}^{NPRACH}-1\}$ by the MAC layer. In addition, the pseudo random generator is initialized to $c_{init}=N_{ID}^{Ncell}$.

Baseband Signal Generation

A time-continuous random access signal $s_i(t)$ for a symbol group i is defined by Equation 2 below.

$$s_i(t) = \beta_{NPRACH} e^{j2\pi(n_{SC}^{RA}(i)+Kk_0+1/2)\Delta f_{RA}(t-T_{CP})} \qquad \text{Equation 2}$$

Here, $0 \leq t < T_{SEQ}+T_{CP}$, $\beta_{NPRACH}$ represents an amplitude scaling factor for following transmission power $P_{NPRACH}$, $k_0=-N_{sc}^{UL}/2$, and $K=\Delta f/\Delta f_{RA}$ represents a difference in a subcarrier interval between transmissions of the random access preamble and uplink data.

In addition, a position in a frequency domain is controlled by a parameter $n_{SC}^{RA}(i)$.

A variable $\Delta f_{RA}$ is given by Table 4 below.

That is, Table 4 shows one example of random access baseband parameters.

TABLE 4

| Preamble format | $\Delta f_{RA}$ |
|---|---|
| 0, 1 | 3.75 kHz |

PUSCH-Config

IE PUSCH-ConfigCommon is used to designate a common PUSCH configuration and a reference signal configuration for PUSCH and PUCCH. IE PUSCH-ConfigDedicated is used to designate a UE-specific PUSCH configuration.

```
-- ASN1START
TDD-PUSCH-UpPTS-r14 ::=            CHOICE {
    release                                    NULL,
    setup
    SEQUENCE {
        symPUSCH-UpPTS-r14
        ENUMERATED {sym1, sym2, sym3, sym4, sym5, sym6}
                                        OPTIONAL,  -- Need ON
        dmrs-LessUpPTS-r14
        ENUMERATED {true}       OPTIONAL   -- Need OR
    }
}
-- ASN1STOP
```

In Table 5, symPUSCH-UpPTS indicates the number of data symbols set for PUSCH transmission in UpPTS.

sym2, sym3, sym4, sym5, and sym6 values may be used for a normal cyclic prefix and sym1, sym2, sym3, sym4, and sym5 values may be used for an extended cyclic prefix.

Mapping to Physical Resources

For UpPTS, when dmrsLess-UpPts is set to 'true', then the physical resource mapping starts at a $l=N=N_{symb}^{UL}-$symPUSCH_upPts symbol of a second slot of a special subframe, otherwise the physical resource mapping starts at $l=N=N_{symb}^{UL}-$symPUSCH_upPts−1 of the second slot of the special subframe.

Hereinafter, when supporting Time Division Duplexing (TDD) in a Narrowband (NB)-IoT system supporting cellular Internet of Things (IoT) proposed in this specification (i.e., when supporting frame structure type 2), a method for designing the random access preamble will be described. As described above, the random access preamble used in the NB-IoT system may be referred to as a Narrowband Random Access Channel (NRACH) preamble.

First, narrowband (NB)-LTE may mean a system for supporting low complexity and low power consumption, which has a system bandwidth corresponding to one Physical Resource Block (PRB) of an LTE system. This may be primarily used as a communication scheme for implementing Internet of things (IoT) by supporting a device such as machine-type communication (MTC) in a cellular system.

The NB-IoT system uses the same OFDM parameters such as subcarrier spacing and the like as in an existing system (i.e., LTE system) to allocate 1 PRB to a legacy LTE band for NB-LTE without additional band allocation, thereby efficiently using a frequency. Hereinafter, the NB-IoT system will be described with reference to the LTE system, but the methods proposed in this specification may be extended and applied to a next generation communication system (e.g., a new RAT (NR) system), of course.

The physical channel of the NB-LTE may be defined as NPSS/NSSS, NPBCH, NPDCCH/NEPDCCH, NPDSCH, etc. in the case of downlink and may be named by adding N in order to distinguish the NB-LTE from the existing system (i.e., LTE system).

Figure 8:
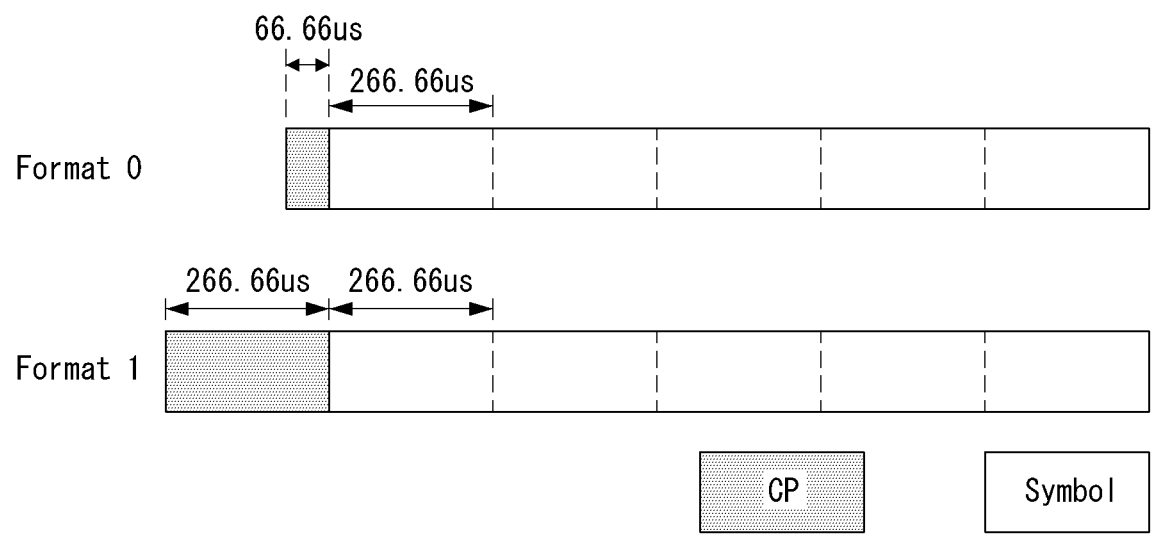
FIG. 8 illustrates an example of an NPRACH preamble format in an NB-IoT system.

The NPRACH preamble used in Frequency Division Duplexing (FDD) NB-IoT up to the existing system (e.g. 3GPP Rel.14) has two formats and a specific may be illustrated in FIG. 8.

FIG. 8 illustrates an example of an NPRACH preamble format in an NB-IoT system.

Referring to FIG. 8, the NPRACH preamble is used for single tone transmission and has a subcarrier spacing of 3.75 kHz. In addition, five symbols and one cyclic prefix (CP) are combined to constitute one symbol group.

In this case, NPRACH preamble format 0 may be constituted by a CP of 66.66 us and five contiguous symbols of 266.66 us and NPRACH preamble format 1 may be constituted by a CP of 266.66 us and five contiguous symbols of 266.66 us. In this case, the length of the symbol group of the NPRACH preamble format 0 may be 1.4 ms and the length of the symbol group of the NPRACH preamble format 1 may be 1.6 ms.

In addition, a basic unit for repetition (i.e., repetitive transmission) may be constituted by four symbol groups. That is, four symbol groups may be used to perform (or form) one repetition. Accordingly, the length of four contiguous symbol groups constituting one repetition may be 5.6 ms for the NPRACH preamble format 0 and 6.4 ms for the NPRACH preamble format 1.

Figure 9:
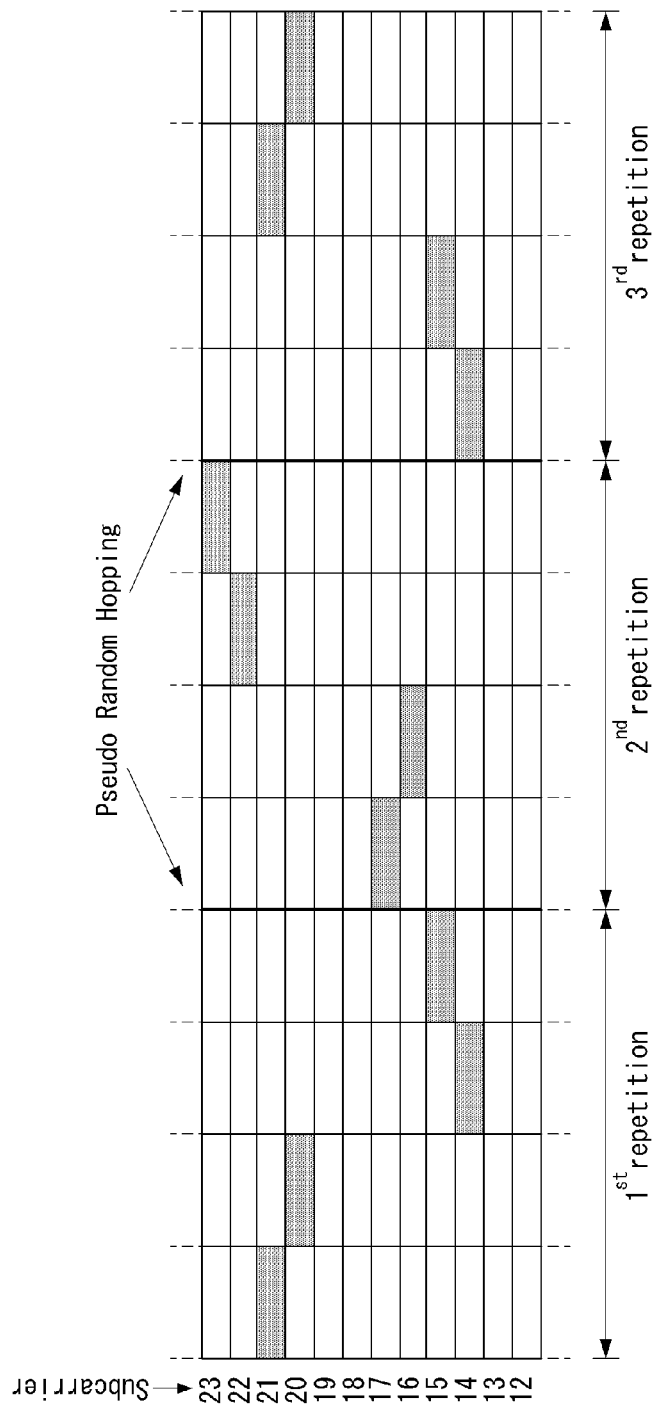
FIG. 9 is a diagram illustrating an example of repetition and a random hopping method of the NPRACH preamble.

Further, as illustrated in FIG. 9, the NPRACH preamble may be configured to perform first hopping with a spacing equal to the subcarrier spacing and second hopping with a spacing equal to six times the subcarrier spacing.

FIG. 9 is a diagram illustrating an example of repetition and a random hopping method of the NPRACH preamble.

However, in TDD (i.e., frame structure type 2 described above) considered in the next generation NB-IoT system (e.g., NB-IoT in 3GPP Rel.15), it may be difficult to directly use the NPRACH preamble format in existing NB-IoT (e.g., legacy NB-IoT in 3GPP Rel. 14) by considering the UL/DL configuration of the existing LTE system. However, although a TDD standalone mode may be configured to use the NPRACH preamble format of the existing NB-IoT by introducing a new UL/DL configuration, an in-band mode and/or a guard band mode may not be easy to use the NPRACH preamble format of the existing NB-IoT as it is.

Therefore, hereinafter, in this specification, a method for designing the NPRACH preamble in consideration of the case where TDD (i.e., frame structure type 2) is applied to the NB-IoT system will be proposed.

Hereinafter, the embodiments and/or methods (i.e., the concept of the present invention) proposed in this specification may be extended and applied even to other channels than the random access channel (PRACH) and may be extended not only to a single-tone transmission scheme but also to a multi-tone transmission scheme, of course.

Further, as mentioned above, the embodiments and/or methods proposed in this specification may be extended and applied to the next generation communication system (e.g., NR system) as well as the LTE system, of course.

Further, the embodiments and/or methods proposed in this specification are described based on the in-band mode or guard band mode in the TDD, the method proposed in this specification may be applied even in the standalone mode, of course.

Furthermore, the embodiments and/or methods proposed in this specification are distinguished for convenience of description only and that some configurations or features of any embodiment and/or method may be included in other embodiments or methods or may be replaced with corresponding configurations or features of other embodiments and/or methods.

Method for designing or configuring enhanced NPRACH preamble in consideration of TDD (i.e., frame structure type 2)

As illustrated in FIG. 9 above, it may be advantageous in terms of performance to configure the first hopping and the second hopping to be performed in contiguous UL subframes. However, when the existing NPRACH preamble format is also used in the TDD, there is no UL/DL configuration (see Table 1 described above) capable of continuously transmitting four symbol groups.

Therefore, when designing the NPRACH preamble for the TDD, (1) a scheme of reducing the number of symbols to be included in one symbol group, (2) a scheme of reducing a symbol length while increasing the subcarrier spacing, or (3) a scheme of reducing the CP length may be considered. Alternatively, the NPRACH preamble may be designed by combining schemes (1) to (3) described above.

Table 6 shows continuous UL subframes for each configuration in the UL/DL configuration of Table 1 described above.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 6, configurations #0, #1, #3, #4, and #6 except for configuration #2 and configuration #5 contiguously include at least two UL subframes.

Specifically, in configuration #0, subframes #2, #3, and #4 and subframes #7, #8, and #9 may be contiguous, in configuration #1, subframes #2 and #3 and subframes #7 and #8 may be contiguous, in configuration #3, subframes #2, #3, and #4 may be contiguous, in configuration #4, subframes #2 and #3 may be contiguous, and in configuration #6, subframes #2, #3, and #4 and subframes #7 and #8 may be contiguous.

However, in this specification, a criterion for determining the number of contiguous UL subframes may be configured to a UL subframe (i.e., a valid UL subframe) which the UE may actually transmit. For example, even when two UL subframes are contiguously configured on the UL/DL configuration as shown in Table 6, if one UL subframe of two UL subframes is a UL subframe (i.e., invalid) UL subframe) which the UE may not use, this may mean that there is only one contiguous UL subframe.

Hereinafter, more specifically, when the TDD (i.e., frame structure type 2) is applied to the NB-IoT system, various methods related to the design of the NPRACH preamble will be described. Hereinafter, in the methods proposed in this specification, the preamble may be the NPRACH preamble in the NB-IoT system.

(Method 1)

First, a method for configuring the preamble such that a symbol group(s) including a certain number of hops is(are) transmitted in contiguous uplink subframes may be considered. Here, the hop may mean that hopping in the frequency domain occurs between the symbol groups.

Hereinafter, for convenience of description, the symbol group(s) including H hops will be expressed and described as being transmitted in L contiguous uplink subframes. Here, an H value may be a positive integer larger than 1 and an L value may be the positive integer.

At this time, if H of a specific value is determined, the number of symbol groups to be transmitted in L contiguous UL subframes may be H+1. Hereinafter, the number of symbol groups transmitted in L contiguous uplink subframes is represented by G (i.e., H+1).

In addition, when the H value is fixed, the number (hereinafter referred to as N) of symbols constituting each symbol group and the cyclic prefix (CP) length may be changed according to the number of Ls, so that different preamble formats may be configured according to the L value and the H value. In particular, a case of an example in which H=2 and G=3 may be considered, which may be expressed as shown in FIG. 10.

Figure 10:
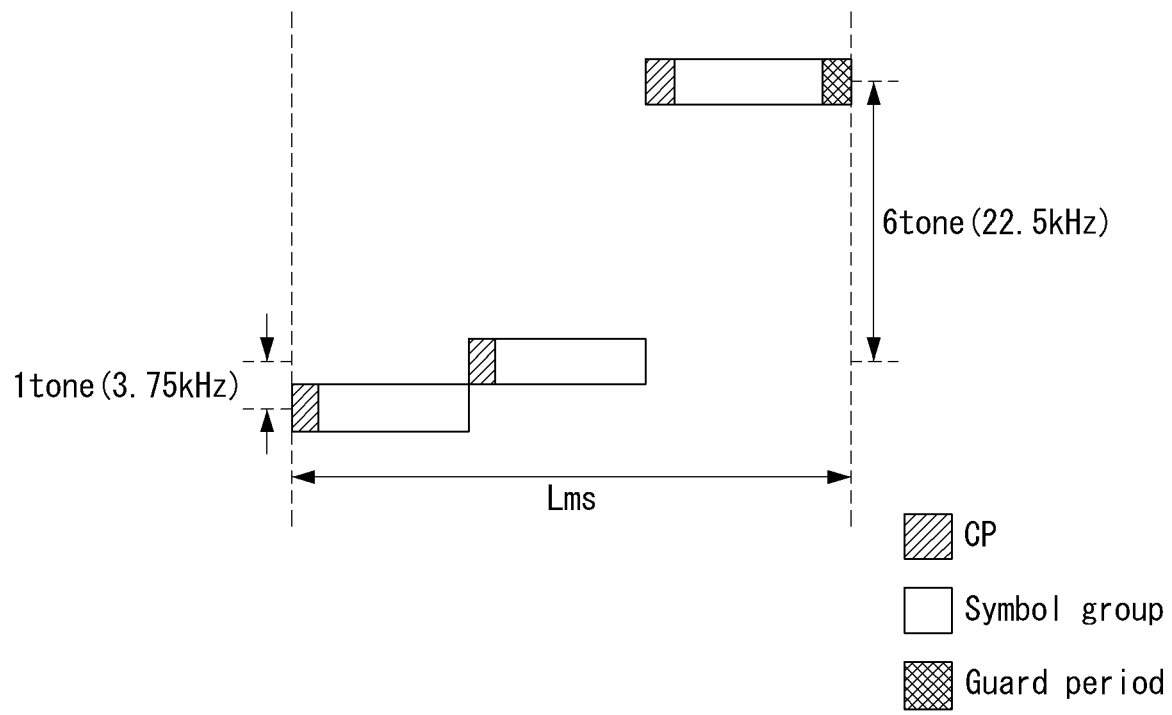
FIG. 10 illustrates an example of the NPRACH preamble in a wireless communication system to which a method proposed in this specification may be applied.

FIG. 10 illustrates an example of the NPRACH preamble in a wireless communication system to which a method proposed in this specification may be applied. FIG. 10 is just for convenience of the description and does not limit the scope of the present invention.

Referring to FIG. 10, it is assumed that the subcarrier spacing is 3.75 kHz for the transmission of the preamble and the sizes of two hops may be 3.75 kHz and 22.5 kHz, respectively. Further, frequency hopping illustrated in FIG. 10 is merely an example, so that the hopping may freely make a difference in either a positive direction or a negative direction. In addition, an order between the hopping of 3.75 kHz and the hopping of 22.5 kHz may be configured opposite to that illustrated in FIG. 10.

As an example, in a case where the L value is 1 (i.e., within the transmission time unit and the subframe supported by the NB-IoT system), three symbol groups may be configured to be contiguously transmitted within the corresponding interval. Here, three contiguously transmitted symbol groups may be referred to as a symbol group set or a sub-preamble.

Specifically, in order to contiguously transmit three symbol groups within 1 ms, each symbol group may be constituted by one symbol (i.e., the symbol length is 8192 Ts in the 3.75 kHz subcarrier spacing) and the CP length is set to a maximum of 1572 Ts, and a guard period at this time may be set to 1428 Ts. Here, as illustrated in FIG. 1 described above, Ts may be 1/30.72 (us).

Further, as mentioned above, the symbol group may be a concept that includes one CP and at least one symbol.

In the case of the preamble illustrated in FIG. 10, a maximum delay spread of 4.69 us is supported as in the existing LTE system and a maximum cell radius may be 6.97 km. If it is desired to cover a cell smaller than the cell radius, a method for reducing the CP length may be considered. At this time, when the CP length is equal to or larger than 448 TS which is the CP length of the LTE PRACH preamble format 4, 1.4 km or more may be covered. A reduced space may be used as the guard period. Characteristically, a preamble capable of transmitting two different sized hops (i.e., hopping) using 3 symbol groups per 1 ms may be considered as a preamble format that supports short coverage (i.e., narrow coverage) of the NB-IoT supporting the TDD.

At this time, the cell radius may be determined by Equation 3.

Maximum cell radius={min((preamble CP length−legacy min CP length),guard period)}/(round trip delay(us))   Equation 3

In Equation 3, 'legacy min CP length' may be 144 TS which is a normal CP length of 15 kHz subcarrier spacing, 'preamble CP length' may mean the CP length of the preamble, 'guard period' may mean the length of the guard period, and 'round trip delay (us)' may mean a round-trip delay time.

When the preamble format as described above is referred to as format 1, formats applicable to cases where the numbers of L values are 2 and 3 may be referred to as format 2 and format 3, respectively. At this time, format 1, format 2, and format 3 may be arranged as shown in Table 7.

TABLE 7

| Format | L (# of contiguous UL SF) | CP length | # of symbol in symbol group (N) | Guard period | Max. cell radius |
| --- | --- | --- | --- | --- | --- |
| Format 1 | 1 | ~1572 TS | 1 | 1428 TS | 6.97 km |
| Format 2 | 2 | ~3108 TS | 2 | 2964 TS | 14.47 km |
| Format 3 | 3 | ~4644 TS | 3 | 4500 TS | 21.97 km |

The CP length calculated in Table 7 is the maximum CP length calculated to achieve the maximum cell coverage under each condition and as mentioned above, the CP length should be equal to or larger than 448 TS to cover 1.4 km or more and the remainder may be used as the guard period.

When determined as such, each preamble may be configured to be transmitted along a specific hopping pattern regardless of the format. That is, it may be configured that three symbol groups with differences of first +1 tones and +6 tone are transmitted in L contiguous uplink subframes and then three symbol groups with differences of −1 tone and −6 tone are transmitted in L contiguous uplink subframes. In this case, both a case that + is changed to − and a case that the orders of 1 tone and 6 tone are modified may be available, of course. Further, + gap and − gap may be transmitted in L contiguous uplink subframes.

In addition, as illustrated in FIG. 10, three symbol groups showing the differences of 1 tone and 6 tone may be configured (or promised) in a single repetition unit and the UE may be configured to transmit the single repetition unit as many as repetition numbers set by the base station.

Similarly, in the NB-IoT system, when a different format (i.e., preamble format) is determined according to the number of contiguous uplink subframes, i.e., uplink transmission duration that may be contiguously transmitted by the UE, the base station may configure a certain number of usable specific preamble formats among multiple preamble formats to the UE according to the uplink/downlink configuration (hereinafter referred to as UL/DL configuration) to be used for the cell.

For example, in the case of UL/DL configuration #1 in which two contiguous uplink subframes may be secured, the base station may configure each of a preamble format suitable for 1 ms (i.e., one subframe) and a preamble format suitable for 2 ms (i.e., two subframes) to the UE, respectively.

When the base station is configured to use the preamble format suitable for 1 ms in the UL/DL configuration in which the number of contiguous uplink subframes may be secured as L, (a) the UE may be configured to transmit G symbol groups and one guard period in L contiguous uplink subframes contiguously repeatedly L times. Here, G symbol groups may mean G contiguously transmitted symbol groups.

Alternatively, when the base station is configured to use the preamble format suitable for 1 ms in the UL/DL configuration in which the number of contiguous uplink subframes may be secured as L, (b) the UE may be configured to transmit G symbol groups contiguously repeatedly L times and last transmits the guard period contiguously repeatedly L times in L contiguous uplink subframes. Here, G symbol groups may mean G contiguously transmitted symbol groups.

Method (a) described above may be configured without changing the existing scheme. However, method (b) described above may be configured so that only when the single repetition unit may be transmitted twice or more contiguously according to the preamble format and the UL/DL configuration configured by the base station, the last transmitted guard period is subsequently transmitted at a time after the single repetition unit is contiguously transmitted. Here, the single repetition unit may be constituted by N symbol groups and one guard period.

In addition, the single repetition unit may be changed according to the scheme of configuring the preamble and it is natural that the single repetition unit may be replaced and applied with a sub-preamble. Here, the sub-preamble is a 1/K unit of the single repetition unit, and single repetition may be at last terminated only when the sub-preamble is transmitted in L contiguous uplink subframes and K sub-preambles are all transmitted. Further, a concept of repetitive transmission of the single repetition unit as many as the repetition numbers may be said to remain unchanged.

Examples for methods (a) and (b) described above may be illustrated in FIGS. 11A and B.

Figures 11A, 11B:
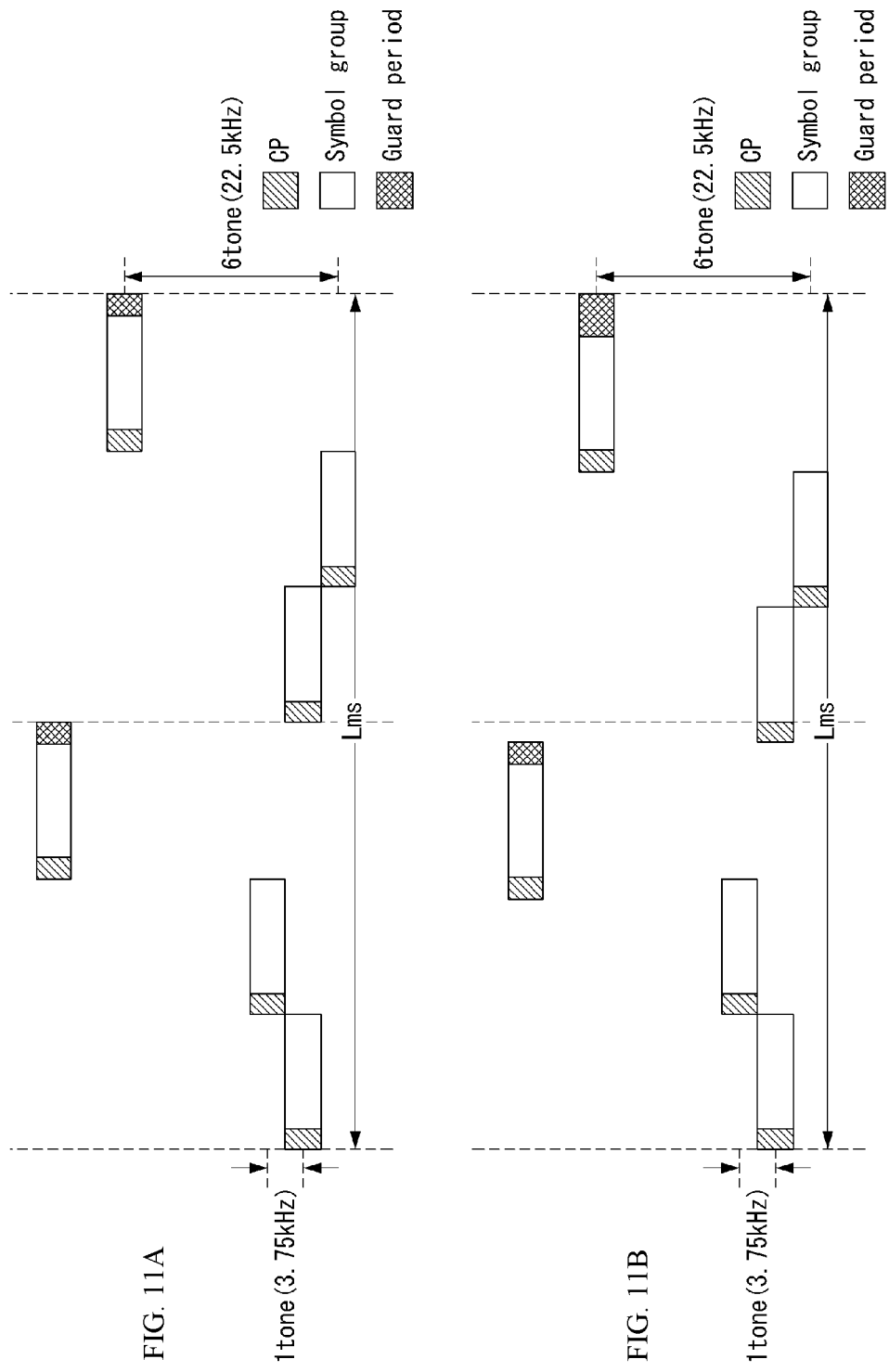
FIGS. 11A and 11B illustrates examples of repetitive transmissions based on the NPRACH preamble in the wireless communication system to which the method proposed in this specification may be applied.

FIGS. 11A and 11B illustrate examples of repetitive transmission based on the NPRACH preamble in the wireless communication system to which the method proposed in this specification may be applied. FIGS. 11A and 11B is just for convenience of the description and does not limit the scope of the present invention.

FIG. 11A illustrates an example of a case where the UE transmits G symbol groups and one guard period contiguously repeatedly L times in L contiguous uplink subframes. Unlike this, 11B illustrates an example of a case where the UE transmits G symbol groups contiguously repeatedly L times and last transmits the guard period contiguously repeatedly L times in L contiguous uplink subframes.

In addition, the NPRACH preamble (i.e., single repetition unit) in which three symbol groups are repeated twice, which is illustrated in FIG. 10 may be configured. As an example, when hopping distances (i.e., hop) of three symbol groups transmitted earlier are +3.75 kHz and +22.5 kHz, the hopping distances of three symbol groups transmitted later may be set to −3.75 kHz and −22.5 kHz. In this case, a total of six symbol groups may be configured by one NPRACH preamble.

Figure 12:
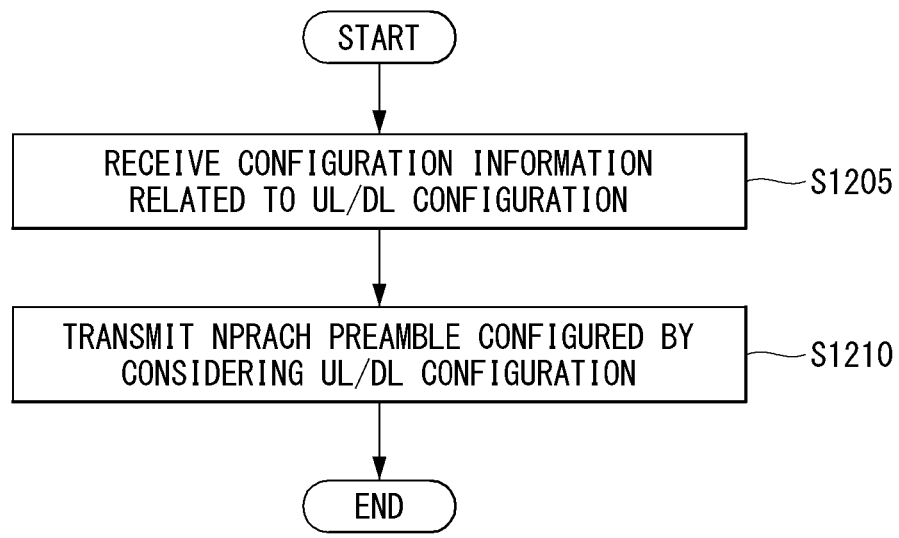
FIG. 12 illustrates an operational flowchart of a user equipment which transmits the NPRACH preamble in the wireless communication system to which the method proposed in this specification may be applied.
Figure 13:
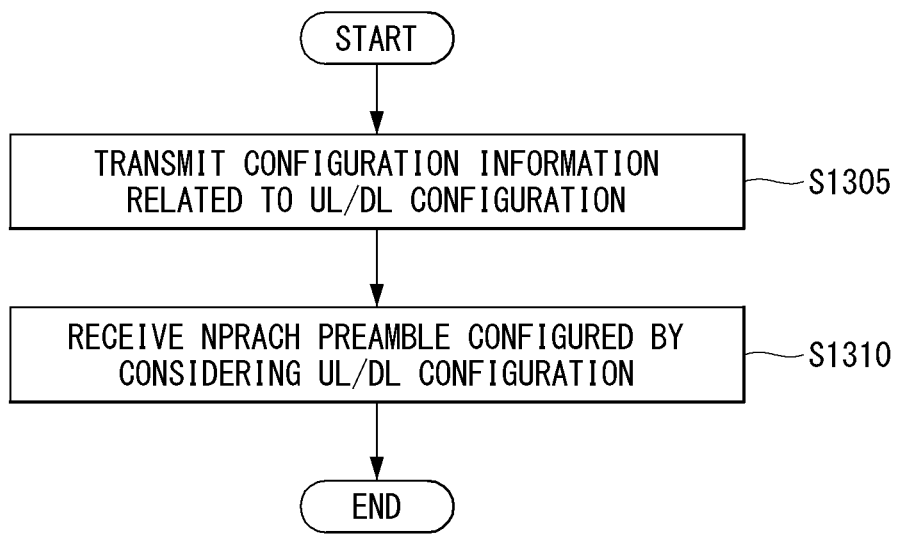
FIG. 13 illustrates an operational flowchart of a base station which receives the NPRACH preamble in the wireless communication system to which the method proposed in this specification may be applied.

In this regard, in the NB-IoT system supporting the TDD, operations of the UE and the base station transmitting and receiving the NPRACH preamble may be performed as illustrated in FIGS. 12 and 13.

FIG. 12 illustrates an operational flowchart of a UE transmitting the NPRACH preamble in the wireless communication system to which the method proposed in this specification may be applied. FIG. 12 is just for convenience of the description and does not limit the scope of the present invention.

Referring to FIG. 12, it is assumed that the UE and the base station perform a random access procedure in the NB-IoT system supporting the TDD. Further, it is assumed that the UE and the base station transmit and receive the NPRACH preamble based on the methods (i.e., methods 1, 2, 3, and/or 4) proposed in this specification.

First, the UE may receive configuration information related to the UL/DL configuration from the base station (step S1205). As an example, the configuration information related to the UL/DL configuration may be information as shown in Table 1 above. Here, the UL/DL configuration may be configured based on the above-described frame structure type 2 related to the TDD.

Thereafter, the UE may transmit the NPRACH preamble configured in consideration of the received UL/DL configuration to the base station (step S1210). As an example, the UE may transmit to the base station the NPRACH preamble configured in consideration of the number of contiguous uplink subframes in the UL/DL configuration, as in the methods proposed in this specification.

At this time, as described above, the NPRACH preamble transmitted by the terminal to the base station may include two symbol group sets. Here, the symbol group set may include three contiguous symbol groups as mentioned above. That is, the symbol group set may denote a unit (or a set) of contiguously transmitted symbol groups and in the operation in FIG. 12, it is particularly assumed that the symbol group set is constituted by three contiguous symbol groups. In addition, the length of each symbol group set may be set shorter than a transmission time unit (i.e., a subframe according to frame structure type 2, 1 ms) in the NB-IoT system. Further, each symbol group may include one CP and one symbol.

In addition/alternatively, the number of symbol group sets included in the NPRACH preamble, the number of symbol groups included in the symbol group set, and the number of symbols included in the symbol group are set differently according to the uplink-downlink configuration supported by the base station.

Figure 32:
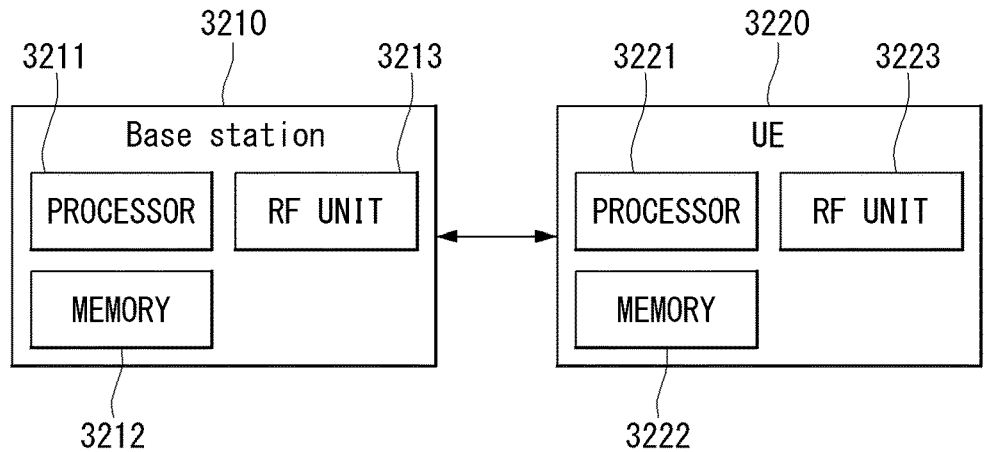
FIG. 32 illustrates a block diagram of a wireless communication device to which methods proposed in this specification may be applied.
Figure 33:
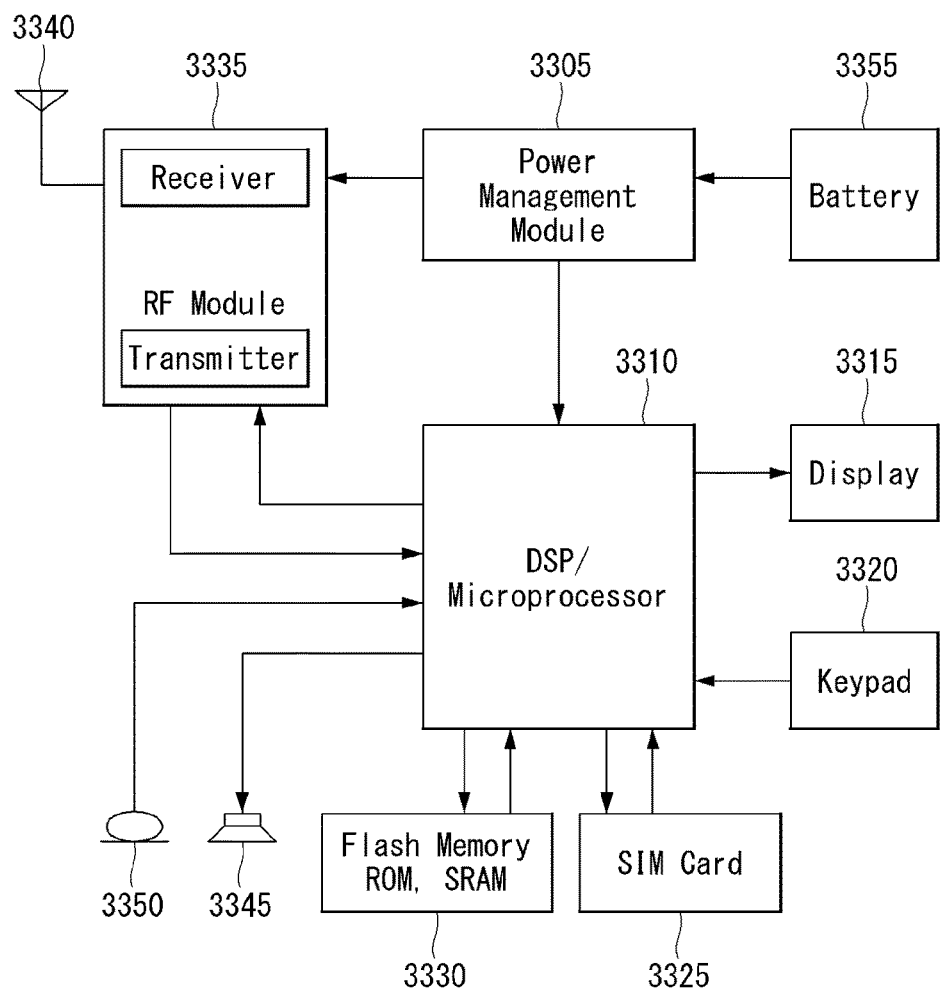
FIG. 33 illustrates a block diagram of a communication device according to an embodiment of the present invention.

With respect to the above-described operation of the UE, the UE may be configured as devices as illustrated in FIGS. 32 and 33. Taking this into consideration, the operation in FIG. 12 described above may be performed by the devices illustrated in FIGS. 32 and 33.

For example, a processor 3221 (or a processor 3310) may receive configuration information related to the UL/DL configuration from the base station (step S1205). Further, the processor 3221 (or processor 3310) may transmit to the base station the NPRACH preamble configured in consideration of the received UL/DL configuration (step S1210).

FIG. 13 illustrates an operational flowchart of a base station receiving the NPRACH preamble in the wireless communication system to which the method proposed in this specification may be applied. FIG. 12 is just for convenience of the description and does not limit the scope of the present invention.

Referring to FIG. 13, it is assumed that the UE and the base station perform the random access procedure in the NB-IoT system supporting the TDD. Further, it is assumed that the UE and the base station transmit and receive the NPRACH preamble based on the methods proposed in this specification.

First, the base station may transmit the configuration information related to the UL/DL configuration to the UE (step S1305). As an example, the configuration information related to the UL/DL configuration may be information as shown in Table 1 above. Here, the UL/DL configuration may be configured based on the above-described frame structure type 2 related to the TDD.

Thereafter, the base station may receive the NPRACH preamble configured in consideration of the UL/DL configuration from the UE (step S1310). As an example, the base station may receive from the UE the NPRACH preamble configured in consideration of the number of contiguous uplink subframes in the UL/DL configuration, as in the methods proposed in this specification.

At this time, as described above, the NPRACH preamble transmitted by the terminal to the base station may include two symbol group sets. Here, the symbol group set may include three contiguous symbol groups as mentioned above. That is, the symbol group set may denote a unit (or a set) of contiguously transmitted symbol groups and in the operation in FIG. 13, it is particularly assumed that the symbol group set is constituted by three contiguous symbol groups. In addition, the length of each symbol group set may be set shorter than a transmission time unit (i.e., a subframe according to frame structure type 2, 1 ms) in the NB-IoT system. Further, each symbol group may include one CP and one symbol.

In addition/alternatively, the number of symbol group sets included in the NPRACH preamble, the number of symbol groups included in the symbol group set, and the number of symbols included in the symbol group are set differently according to the uplink-downlink configuration supported by the base station.

With respect to the above-described operation of the base station, the base station may be configured as a device as illustrated in FIG. 32. Taking this into consideration, the operation of the base station in FIG. 13 described above may be performed by the device illustrated in FIG. 32.

For example, a processor 3211 may transmit the configuration information related to the UL/DL configuration to the UE (step S1305). Further, the processor 3211 may receive the NPRACH preamble configured in consideration of the UL/DL configuration from the UE (step S1310).

As described above, when three symbol groups are configured to be arranged in one transmission time unit (for example, 1 ms), and when each symbol group is configured by only one symbol, the UE may efficiently transmit the NPRACH preamble.

In general, since cell coverage of a TDD cell is set to be smaller than the cell coverage of an FDD cell as described above, PRACH preamble format 4 for short coverage is used in the existing LTE TDD system. In this case, when a specific LTE TDD cell supports PRACH preamble format 4 and the TDD cell intends to support an NB-IoT in-band mode or guard band mode in the TDD cell, it is necessary to consider introduction of a new NPRACH preamble format capable of supporting the short coverage. In this case, since the CP length for covering the cell coverage supported by the LTE PRACH preamble format 4 is 488 TS and one symbol is 8192 TS, a symbol group (488 TS+8192 TS) constituted by one CP and one symbol may be included in one subframe (i.e., 30720 TS) contiguously three times.

An effect of the case where the symbol group included contiguously three times is that one more frequency gap between the symbol groups may be made than the case where the symbol group is included contiguously two times. That is, when the symbol group is included contiguously twice, a distance between two symbol groups may be one of 22.5 kHz or 3.75 kHz, but when the symbol group is included contiguously three times, both 3.75 kHz and 22.5 kHz may be set as the distance between the symbol groups. Therefore, since the frequency cap is generated more frequently than the case where the symbol group is included contiguously twice, there is an advantage that in estimating a timing advance (TA) at the base station, the TA may be estimated faster and more accurately. This may be beneficial in terms of battery life and/or latency of the UE.

In addition, in order to improve preamble reception performance at the base station, it may be preferable that a frequency gap having the same size exists in both positive and negative directions in one preamble.

As an example, when there is only one structure in which three symbol groups are arranged in one transmission unit (e.g., 1 ms) (i.e., the NPRACH preamble is configured with one symbol group set), a total of two frequency gaps may be configured, and as a result, only two of ±3.75 kHz and ±22.5 kHz may be included. Meanwhile, when a structure in which three symbol groups are arranged in one transmission unit (e.g., 2 ms) (i.e., the NPRACH preamble is configured with two symbol group sets), a total of four frequency gaps may be configured, and as a result, both ±3.75 kHz and ±22.5 kHz may be included.

Therefore, since a structure in which one preamble is constituted by six symbol groups may include both of ±3.75 kHz and ±22.5 kHz, better preamble reception performance may be expected than the preamble constituted by three symbol groups.

Further, unlike the repetitive transmission method described above, a method for changing one uplink subframe when two or more uplink subframes are contiguously present by changing a specific parameter of a preamble format defined as a target may also be considered. Specifically, a method may be considered in which the CP length of the preamble format defined as the target of one transmission time unit (i.e., sub-frame, 1 ms) is maintained as it is and the number N of symbols in the symbol group is increased by L times when the number of uplink subframes is L.

For example, referring to the above-described example ((CP length=~1572 TS, N=1, G=3), a method may be considered, in which the N value is increased to 2 when the number of contiguous uplink subframes is two and the N value is increased to 3 when the number of contiguous uplink subframes is increased to 3 without changing another parameter. When the corresponding method is used, it is advantageous in that CP overhead is reduced as compared with the above-described repetitive transmission method, but an absolute time required for the single repetition may be increased. Examples for the corresponding method may be illustrated in FIGS. 14A through 14C.

FIGS. 14A through 14C illustrate examples of repetitive transmission of the NPRACH preamble to which the method proposed in this specification may be applied. FIGS. 14A through 14C is just for convenience of the description and does not limit the scope of the present invention.

When the preamble format illustrated in FIG. 14A is defined, the preamble formats illustrated in FIGS. 14B and 14B may be additionally defined. In the case of FIG. 14B, the number of symbols included in each symbol group may be increased by two times as compared with FIGS. 14C and 14A.

Further, similarly, a method for changing the value of the number G of contiguously transmitted symbol groups instead of changing the number N of symbols included in the symbol group may be considered.

(Method 2)

Next, a method for independently defining the preamble format and a hopping format may also be considered. At this time, the preamble format may be configured to configure the CP length configuring the symbol group, the number (that is, N) of symbols in the symbol group, and the like. In addition, the hopping format may be configured to configure the number (i.e., G) of contiguously transmitted symbol groups and a hop distance (e.g., 3.75 kHz, 22.5 kHz), etc.

Each preamble format may be configured to be configured for L contiguous uplink subframes. As an example, when G is 2, the preamble formats may be configured as shown in Table 8.

TABLE 8

| Format | L (# of contiguous UL SF) | CP length | # of symbol in symbol group (N) | Guard period | Max. cell radius |
|---|---|---|---|---|---|
| Format 1 | 1 | ~4827 TS | 1 | 4682 TS | 22.86 km |
| Format 2 | 2 | ~9605 TS | 2 | 9462 TS | 46.2 km |
| Format 3 | 3 | ~8923 TS | 4 | 8778 TS | 42.86 km |

Even in this case, the maximum cell radius may be corrected through Equation 3 mentioned in Method 1 above. The CP length calculated in Table 8 is the maximum CP length calculated to achieve the maximum cell coverage under each condition and as mentioned above, the CP length should be equal to or larger than 448 TS to cover 1.4 km or more and the remainder may be used as the guard period.

Figure 15:
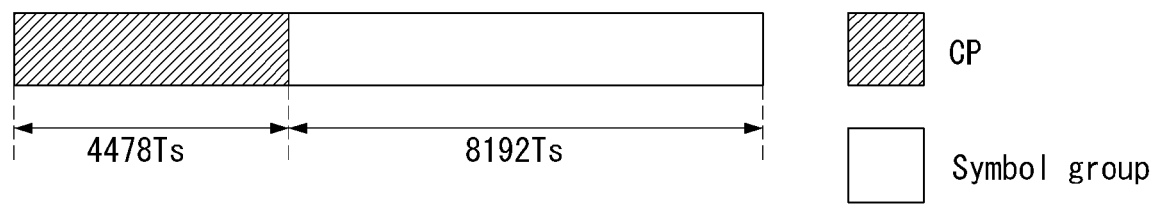
FIG. 15 illustrates an example of a preamble format proposed in this specification.

FIG. 15 illustrates an example of a preamble format proposed in this specification. Referring to FIG. 15, the corresponding preamble format is constituted by a CP having a length of 4478 Ts and a symbol group having a length of 8192 Ts, which may correspond to the preamble format 1 of Table 8 above.

Further, each hopping pattern may be configured to be used to determine the number G of contiguously transmitted symbol groups and the hop distance, the hopping pattern, and the like. When a specific preamble format is configured to be used (i.e., when the specific preamble format is set for the UE), the hopping pattern may be configured differently according to L contiguous uplink subframes. As an example, when the preamble format 1 described above is configured to be used, the hopping patterns that may be considered may be as illustrated in FIG. 15.

Figure 16A:
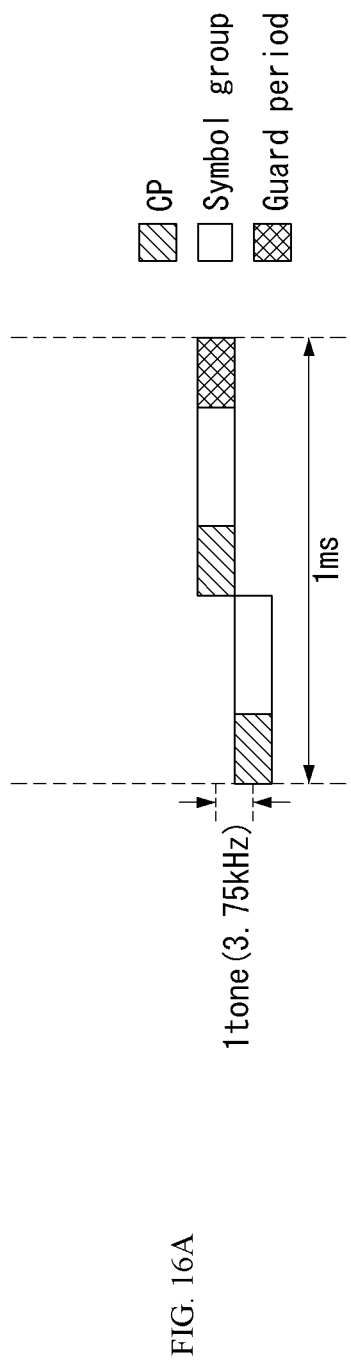
FIGS. 16A through 16C illustrate examples of a hopping format related to a configuration of the NPRACH preamble to which the method proposed in this specification may be applied.
Figure 16B:
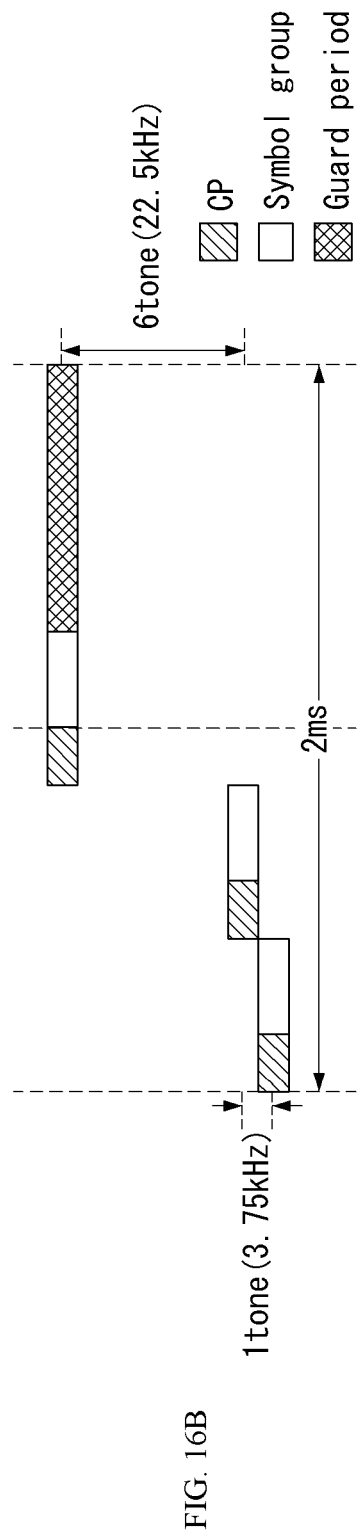
Figure 16C:
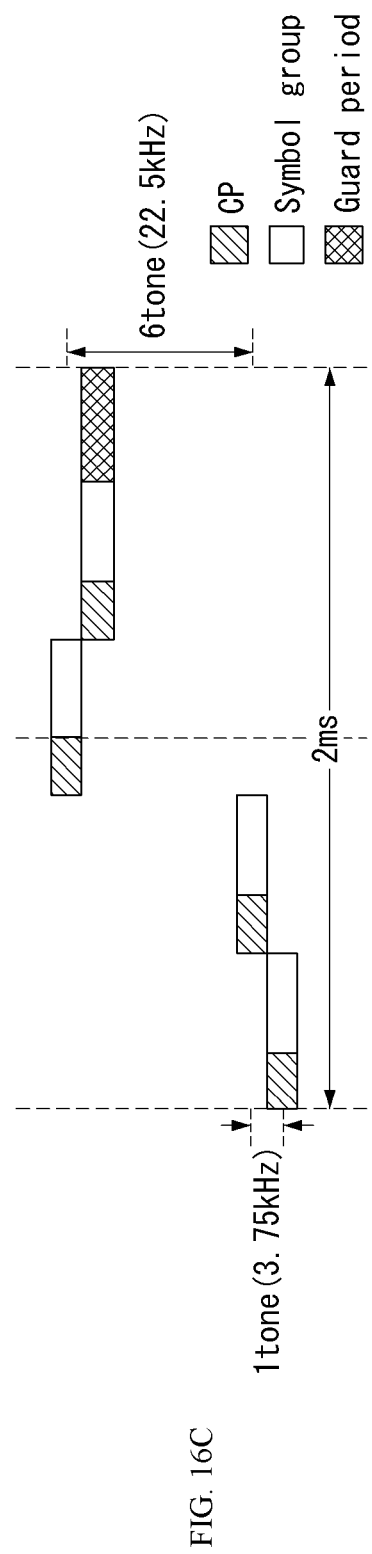

FIGS. 16A through 16C illustrate examples of a hopping format related with a configuration of the NPRACH preamble to which the method proposed in this specification may be applied. FIGS. 16A through 16C is just for convenience of the description and does not limit the scope of the present invention.

FIG. 16A may illustrate hopping format 1, hopping format 1 may mean that G is set to 2, and the hop is set to ±3.75 kHz or ±22.5 kHz. FIG. 16B may illustrate hopping format 2, hopping format 2 may mean that G is set to 3 and the order of the hop is set to ±3.75 kHz, ±22.5 kHz or ±22.5 kHz, ±3.75 kHz. FIG. 16C may illustrate hopping format 3, hopping format 3 may mean that G is set to 4 and the order of the hop is set to ±3.75 kHz, ±22.5 kHz, ±3.75 kHz or ±3.75 kHz, ±3.75 kHz, ±22.5 kHz or ±22.5 kHz, ±3.75 kHz, ±3.75 kHz. Characterfully, in case of the hop of 3.75 kHz, if hopping is first configured in a + direction, hopping may be then configured in a − direction and if hopping is configured in the − direction, hopping may be then configured in the + direction.

As a result, it may be determined that the guard period is determined when the preamble format and the hopping format are determined. Further, the single repetition unit may be configured differently for each hopping format.

For example, in the case of hopping format 1 (i.e., when G is 2), it may be configured that FIG. 16A is defined as the sub-preamble and the single repetition is transmitted only when the corresponding sub-preamble is transmitted twice. Hoping format 2 and hoping format 3 may be configured in such a manner that FIGS. 16B and 16C operate while being defined in the single repetition unit, respectively.

Even when the preamble format and the hopping format are configured as described in method 2, in a case where the base station may be configured to use the preamble format and the hopping format suitable for one transmission time unit (i.e., subframe) in the UL/DL configuration in which the number of contiguous uplink subframes may be secured as L as mentioned in method 1, the UE may be configured to operate according to the same principle as method 1 described above.

That is, the schemes described in method 2 may be mutually combined and/or substituted and applied with the schemes described in method 1.

(Method 3)

Next, a method may be considered in which a set of hopping distance candidates to be transmitted through the preamble is predefined (i.e., preconfigured) and hopping distance candidates to be transmitted by the preamble are transmitted by using multiple symbol groups. That is, this may be a method for preconfiguring a set of candidates of a hopping distance to be applied to the preamble and transmitting the preamble based on the configured set. Here, the preamble may mean a minimum unit which is repeated by the number of repetitions per preamble (e.g., numRepetitionsPerPreambleAttempt) configured through system information (e.g., a system information block (SIB), etc.).

In particular, specific examples of a set of hopping distance candidates to be predefined may be {+3.75 kHz, +22.5 kHz}, {+3.75 kHz, +22.5 kHz, −3.75 kHz}, etc. In this case, when a sign is negative (−) according to a subcarrier index of a first transmitted symbol group, the corresponding set may be {−3.75 kHz, −22.5 kHz}, {−3.75 kHz, −22.5 kHz, +3.75 kHz}, etc.

Thus, it can be said that specific values are arranged in sequence to configure one set and the hopping distance between two symbol groups which are contiguously transmitted follows the order shown in the corresponding set. At this time, although another combination may be made in different orders and different signs from the above example, the spirit of the invention applied thereto may be regarded as the same.

In order to describe method 3, a concept of a mini-preamble may be additionally defined. The mini-preamble may be a minimum unit configured to be transmitted through contiguous uplink subframes among multiple symbol groups constituting the preamble. For each mini-preamble, the hopping distance value and the number of symbol groups may be defined independently. That is, the preamble may be constituted by one or more mini-preambles, and random hopping with a specific rule may occur due to inter-cell interference randomization between the mini-preambles.

At this time, the specific rule may be configured to be randomly selected between an odd subcarrier index or an even subcarrier index according to a hopping distance size and a hopping direction to be included in the mini-preamble. Further, it may be configured that one mini-preamble is not discontinuously transmitted. That is, it may be configured that the mini-preamble is transmitted only in contiguous uplink subframes. Additionally, when one or more mini-preambles may be transmitted to an uplink subframe region where the mini-preamble is transmitted and remained, the UE may be configured to additionally transmit the mini-preamble.

Further, the guard period may be configured to be transmitted only the last time after the maximally transmittable mini-preamble(s) is(are) transmitted according to a predefined method during contiguous uplink subframes. That is, it may be configured that there is no guard period between the mini-preambles transmitted in contiguous uplink subframes.

When the UE transmits the preamble using the method, the UE may transmit the preamble by selecting one scheme of two following embodiments. In order to describe the following embodiments, the preamble format may be defined in the scheme such as method 1 and/or method 2 described above. For convenience of description, the following embodiments are described by adopting preamble format 1 (i.e., the preamble format illustrated in FIG. 15) of method 2 described above. At this time, it is assumed that the set of hopping distance candidates uses {+3.75 kHz, +22.5 kHz} among the above examples. Of course, the schemes described below may be extended and applied even to the case of using {+3.75 kHz, +22.5 kHz, −3.75 kHz} among the above examples.

First Embodiment

First, a method for defining the mini-preamble capable of using only one hop distance is described.

In the embodiment, it is assumed that a first mini-preamble is constituted by two symbol groups which are transmitted back-to-back (i.e., contiguously transmitted) at a distance of 3.75 kHz and a second mini-preamble is constituted by two symbol groups which are transmitted back-to-back at a distance of 22.5 kHz. Here, the first mini-preamble and the second mini-preamble may be configured to be transmitted within one transmission time unit (e.g., subframe, 1 ms).

Hereinafter, examples of a method for transmitting the first mini-preamble and the second mini-preamble according to a specific situation will be described in detail. In this case, the preamble as the minimum unit of the repetitive transmission may be configured by transmitting the first mini-preamble and the second mini-preamble once.

For example, it is assumed that a mini-preamble which is initially transmitted or previously transmitted is the second mini-preamble.

In this case, when the contiguous uplink subframes which the UE may transmit at this time are 1 ms (i.e., when the L value is 1), the UE may transmit the first mini-preamble.

Alternatively, when the contiguous uplink subframes which the UE may transmit at this time are 2 ms (i.e., when the L value is 2), the UE may transmit the first mini-preamble and the second mini-preamble in sequence.

Alternatively, when the contiguous uplink subframes which the UE may transmit at this time are 3 ms (i.e., when the L value is 3), the UE may transmit the first mini-preamble and the second mini-preamble in sequence and additionally transmit the first mini-preamble. At this time, when the number of remaining repetitive transmissions is 1, the UE may be configured to transmit the first mini-preamble and the second mini-preamble in sequence and use the remaining region as the guard period. On the contrary, when the number of remaining repetitive transmissions is 2 or more, the UE may be configured to transmit the first mini-preamble and the second mini-preamble in sequence and additionally transmit the first mini-preamble.

As another example, it is assumed that the previously transmitted mini-preamble is the first mini-preamble.

In this case, when the contiguous uplink subframes which the UE may transmit at this time are 1 ms (i.e., when the L value is 1), the UE may transmit the second mini-preamble.

Alternatively, when the contiguous uplink subframes which the UE may transmit at this time are 2 ms (i.e., when the L value is 2), the UE may first transmit the second mini-preamble and may additionally transmit the first mini-preamble. At this time, when the number of remaining repetitive transmissions is 1, the UE may be configured to transmit the second mini-preamble and use the remaining region as the guard period. On the contrary, when the number of remaining repetitive transmissions is 2 or more, the UE may be configured to first transmit the second mini-preamble and additionally transmit the first mini-preamble.

Alternatively, when the contiguous uplink subframes which the UE may transmit at this time are 3 ms (i.e., when the L value is 3), the UE may first transmit the second mini-preamble and may additionally transmit the first mini-preamble and the second mini-preamble in sequence. At this time, when the number of remaining repetitive transmissions is 1, the UE may be configured to transmit the second mini-preamble and use the remaining region as the guard period. On the contrary, when the number of remaining repetitive transmissions is 2 or more, the UE may be configured to first transmit the second mini-preamble and may additionally transmit the first mini-preamble and the second mini-preamble in sequence.

Further, in configuring the mini-preamble, a size, a direction, an order, etc. of the hopping distance within a predetermined hopping distance set (i.e., a set for hopping distance candidates) may be configured by another combination except for the above proposed combination, of course.

As an example, examples of preamble transmission according to the method proposed in the first embodiment may be as illustrated in FIGS. 17 to 20.

FIGS. 17 to 20 illustrate examples of preamble transmission based on a hopping distance set to which the method proposed in this specification may be applied. FIGS. 17 to 20 are merely for convenience of description and do not limit the scope of the present invention. Referring to FIGS. 17 to 20, as mentioned above, the number of contiguous uplink subframes may be represented by L.

Figure 17:
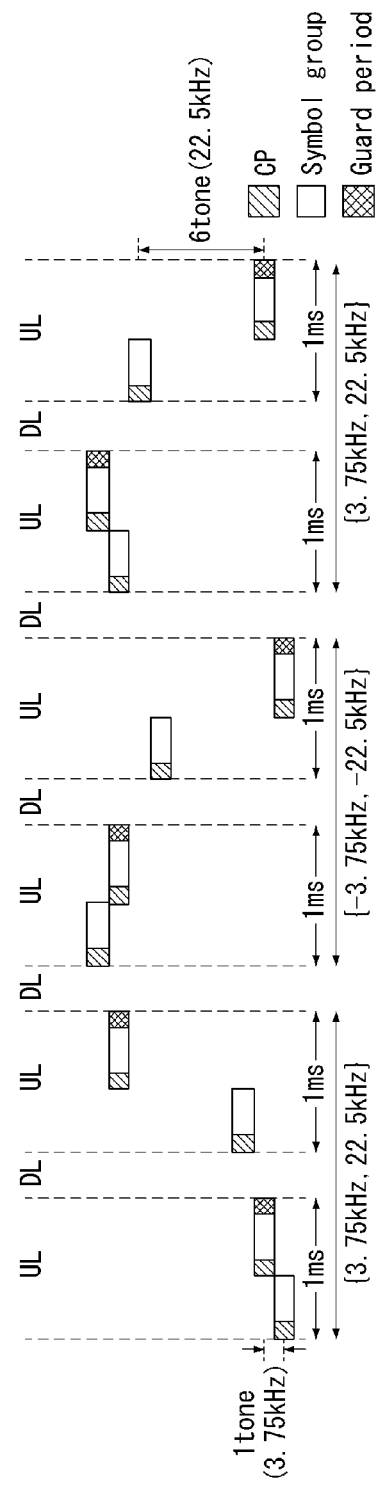
FIGS. 17 to 20 illustrate examples of preamble transmission based on a hopping interval set to which the method proposed in this specification may be applied.

Specifically, FIG. 17 illustrates an example of preamble transmission based on a hopping distance set {+3.75 kHz, +22.5 kHz} when contiguous uplink subframes are 1 ms (i.e., when the L value is 1). In this case, when the sign is determined as negative (−) according to the subcarrier index of the first transmitted symbol group, the hopping distance set may be {−3.75 kHz, −22.5 kHz}.

Figure 18:
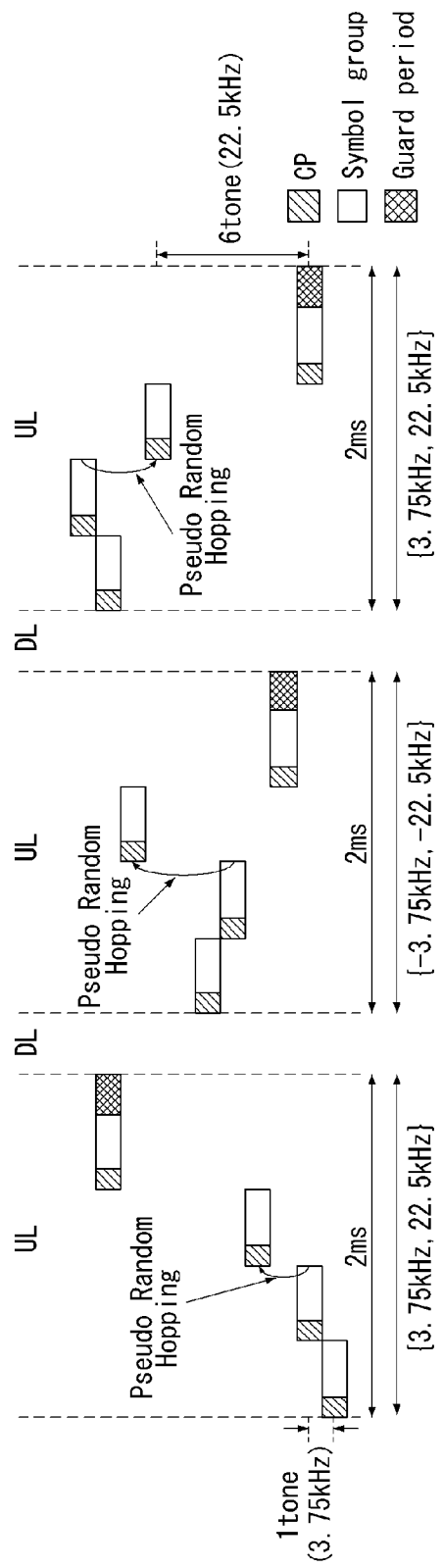

Further, FIG. 18 illustrates an example of preamble transmission based on the hopping distance set {+3.75 kHz, +22.5 kHz} when the contiguous uplink subframes are 2 ms (i.e., when the L value is 2). In this case, when the sign is determined as negative (−) according to the subcarrier index of the first transmitted symbol group, the hopping distance set may be {−3.75 kHz, −22.5 kHz}.

Figure 19:
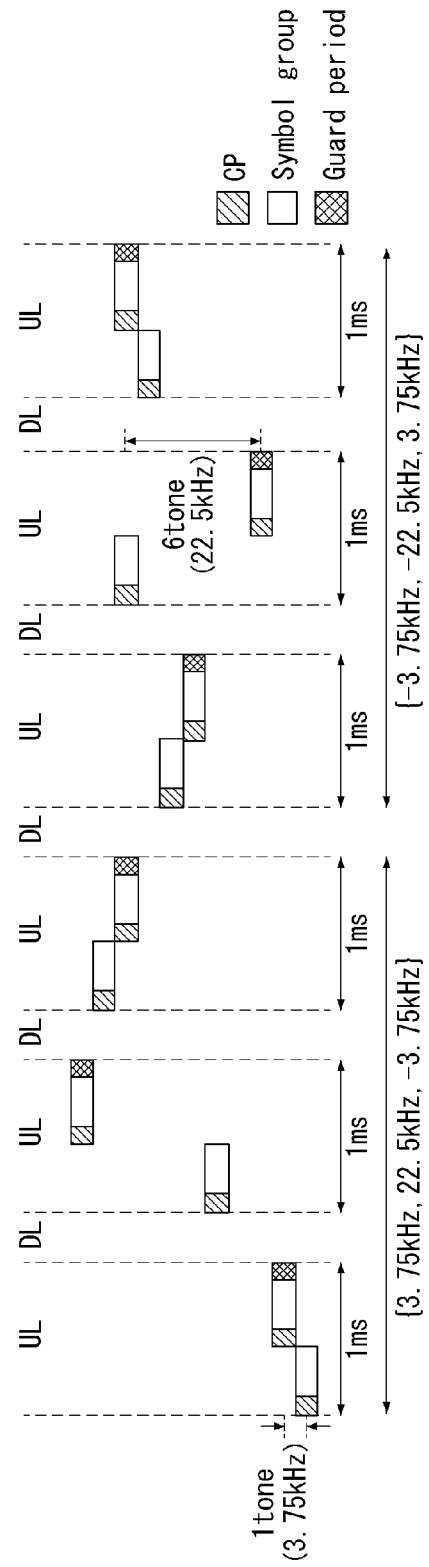

Further, FIG. 19 illustrates an example of preamble transmission based on a hopping distance set {+3.75 kHz, +22.5 kHz, −3.75 kHz} when the contiguous uplink subframes are 1 ms (i.e., when the L value is 1). In this case, when the sign is determined as negative (−) according to the subcarrier index of the first transmitted symbol group, the hopping distance set may be {−3.75 kHz, −22.5 kHz, +3.75 kHz}.

Figure 20:
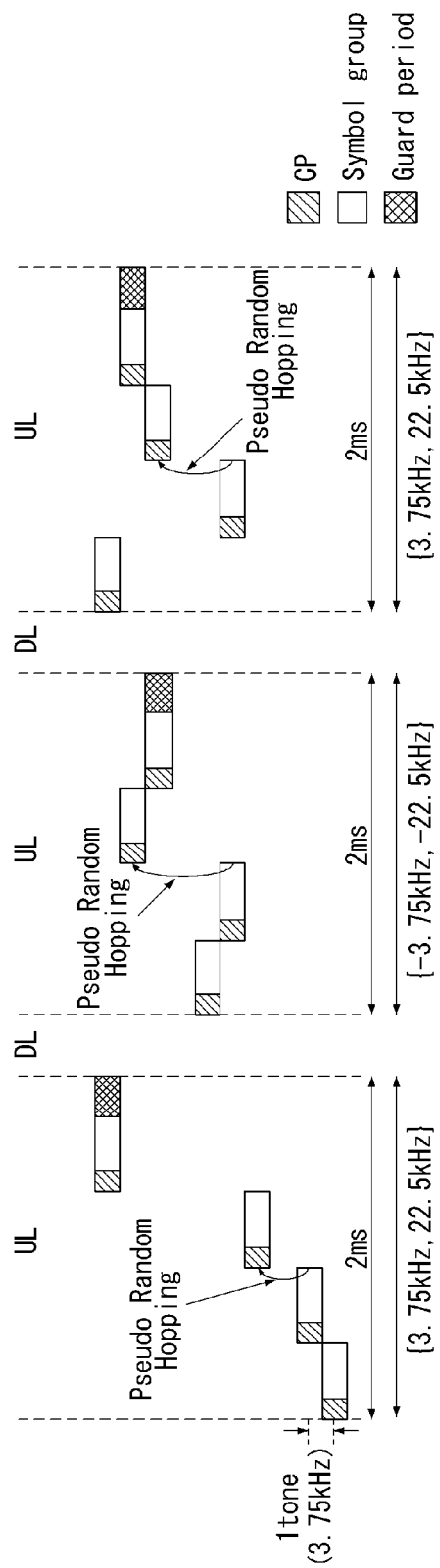

Further, FIG. 20 illustrates an example of preamble transmission based on the hopping distance set {+3.75 kHz, +22.5 kHz, −3.75 kHz} when the contiguous uplink subframes are 2 ms (i.e., when the L value is 2). In this case, when the sign is determined as negative (−) according to the subcarrier index of the first transmitted symbol group, the hopping distance set may be {−3.75 kHz, −22.5 kHz, +3.75 kHz}.

Second Embodiment

Next, a method for defining the mini-preamble capable of using one or more hop distances is described. In this case, the order of the hop distance may be configured to follow the order defined in the set of hopping distance candidates.

In the embodiment, it is assumed that a first mini-preamble is constituted by two symbol groups which are transmitted back-to-back (i.e., contiguously transmitted) at a distance of 3.75 kHz, a second mini-preamble is constituted by two symbol groups which are transmitted back-to-back at a distance of 22.5 kHz, and a third mini-preamble is constituted by three symbol groups which are transmitted back-to-back at distances of 3.75 kHz and 22.5 kHz. Here, the first mini-preamble and the second mini-preamble may be configured to be transmitted within one transmission time unit (e.g., subframe, 1 ms) and the third mini-preamble may be configured to be transmitted within 1.5 times (e.g., 1.5 subframe, 1.5 ms) of the transmission time unit.

Hereinafter, examples of a method for transmitting the first mini-preamble and the second mini-preamble according to a specific situation will be described in detail. In this case, the preamble as the minimum unit of the repetitive transmission may be configured by transmitting the first mini-preamble and the second mini-preamble once or the third mini-preamble may be configured to be transmitted once.

For example, it is assumed that a mini-preamble which is initially transmitted or previously transmitted is the second mini-preamble or the previously transmitted mini-preamble is the third mini-preamble.

In this case, when the contiguous uplink subframes which the UE may transmit at this time are 1 ms (i.e., when the L value is 1), the UE may transmit the first mini-preamble.

Alternatively, when the contiguous uplink subframes which the UE may transmit at this time are 2 ms (i.e., when the L value is 2), the UE may transmit the third mini-preamble.

Alternatively, when the contiguous uplink subframes which the UE may transmit at this time are 3 ms (i.e., when the L value is 3), the UE may first transmit the third mini-preamble and may additionally transmit the third mini-preamble. At this time, when the number of remaining repetitive transmissions is 1, the UE may be configured to transmit the third mini-preamble. On the contrary, when the number of remaining repetitive transmissions is 2 or more, the UE may be configured to first transmit the third mini-preamble and additionally transmit the third mini-preamble.

As another example, it is assumed that the previously transmitted mini-preamble is the first mini-preamble.

In this case, when the contiguous uplink subframes which the UE may transmit at this time are 1 ms (i.e., when the L value is 2), the UE may transmit the first mini-preamble.

Alternatively, when the contiguous uplink subframes which the UE may transmit at this time are 2 ms (i.e., when the L value is 2), the UE may first transmit the second mini-preamble and may additionally transmit the first mini-preamble. At this time, when the number of remaining repetitive transmissions is 1, the UE may be configured to transmit the second mini-preamble. On the contrary, when the number of remaining repetitive transmissions is 2 or more, the UE may be configured to first transmit the second mini-preamble and additionally transmit the first mini-preamble.

Alternatively, when the contiguous uplink subframes which the UE may transmit at this time are 3 ms (i.e., when the L value is 3), the UE may first transmit the second mini-preamble and may additionally transmit the third mini-preamble. At this time, when the number of remaining repetitive transmissions is 1, the UE may be configured to transmit the second mini-preamble. On the contrary, when the number of remaining repetitive transmissions is 2 or more, the UE may be configured to first transmit the second mini-preamble and additionally transmit the third mini-preamble.

In the case of methods proposed in the second embodiment, since it is unnecessary for the UE to transmit one unnecessary symbol group, it is efficient in terms of battery saving, and in the transmission by the same repetition number, there is an advantage in that the symbol group may be first transmitted.

Further, for the second embodiment described above, there may also be considered a method for additionally introducing and combining a fourth mini-preamble constituted by third symbol groups transmitted back-to-back at the hopping distances of 22.5 kHz and 3.75 kHz in sequence. Here, the fourth mini-preamble may be configured to be transmitted within 1.5 times (e.g., 1.5 subframe, 1.5 ms) of the transmission time unit.

Further, similarly to the above-described scheme, methods for transmitting the preamble based on the mini-preamble may be considered even for the set of the hopping distance candidates of {+3.75 kHz, +22.5 kHz, −3.75 kHz}. For example, when the hopping interval set {+3.75 kHz, +22.5 kHz, −3.75 kHz} is applied, mini-preambles that may use one or more hopping distances may be defined as six mini-preambles as follows.

First mini-preamble: Two symbol groups transmitted back-to-back at the distance of 3.75 kHz Second mini-preamble: Two symbol groups transmitted back-to-back at the distance of 22.5 kHz Third mini-preamble: Two symbol groups transmitted back-to-back at the distance of −3.75 kHz Fourth mini-preamble: Three symbol groups transmitted back-to-back at the distances of 3.75 kHz and 22.5 kHz in sequence Fifth mini-preamble: Three symbol groups transmitted back-to-back at the distances of 22.5 kHz and −3.75 kHz in sequence Sixth mini-preamble: Fourth symbol groups transmitted back-to-back at the distances of 3.75 kHz, 22.5 kHz, and −3.75 kHz in sequence Further, in configuring the mini-preamble, a size, a direction, an order, etc. of the hopping distance within a predetermined hopping distance set (i.e., a set for hopping distance candidates) may be configured by another combination except for the above proposed combination, of course.

As an example, examples of preamble transmission according to the method proposed in the second embodiment may be as illustrated in FIGS. 21 to 31.

FIGS. 21 to 31 illustrate other examples of preamble transmission based on a hopping distance set to which the method proposed in this specification may be applied. FIGS. 21 to 31 are merely for convenience of description and do not limit the scope of the present invention. Referring to FIGS. 21 to 31, as mentioned above, the number of contiguous uplink subframes may be represented by L.

Figure 21:
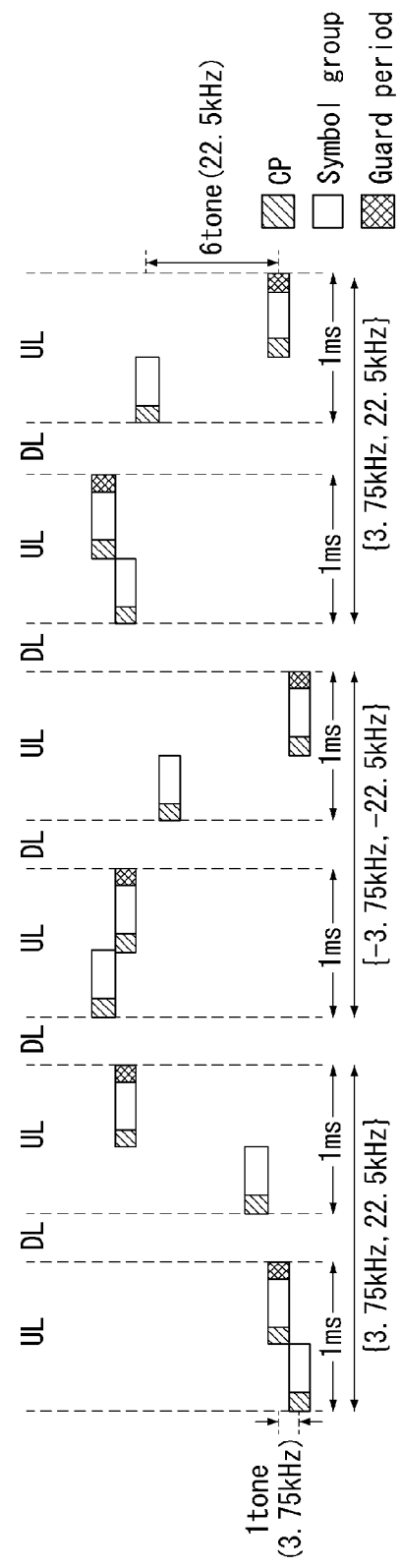
FIGS. 21 to 31 illustrate other examples of the preamble transmission based on the hopping interval set to which the method proposed in this specification may be applied.

Specifically, FIG. 21 illustrates an example of preamble transmission based on a hopping distance set {+3.75 kHz, +22.5 kHz} when contiguous uplink subframes are 1 ms (i.e., when the L value is 1). In this case, when the sign is determined as negative (−) according to the subcarrier index of the first transmitted symbol group, the hopping distance set may be {−3.75 kHz, −22.5 kHz}.

Figure 22:
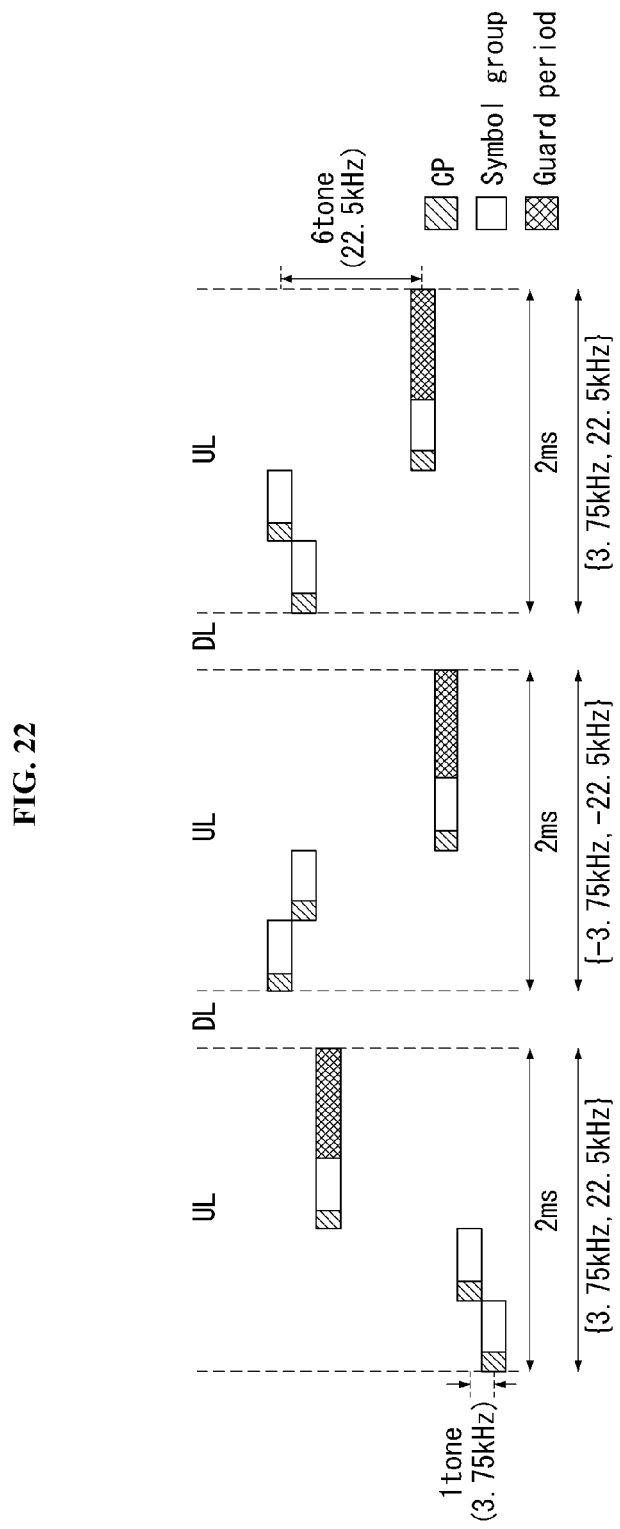

Further, FIG. 22 illustrates an example of preamble transmission based on the hopping distance set {+3.75 kHz, +22.5 kHz} when the contiguous uplink subframes are 2 ms (i.e., when the L value is 2). In this case, when the sign is determined as negative (−) according to the subcarrier index of the first transmitted symbol group, the hopping distance set may be {−3.75 kHz, −22.5 kHz}.

Figure 23:
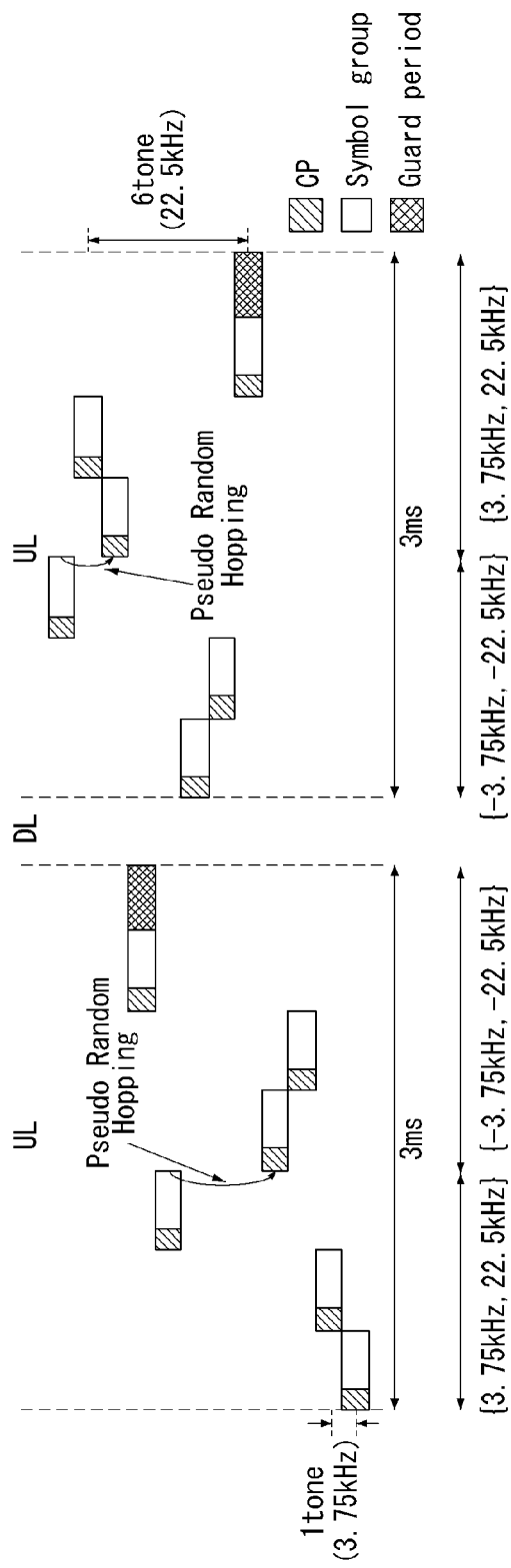

Further, FIG. 23 illustrates an example of preamble transmission based on the hopping distance set {+3.75 kHz, +22.5 kHz} when the contiguous uplink subframes are 3 ms (i.e., when the L value is 3). In this case, when the sign is determined as negative (−) according to the subcarrier index of the first transmitted symbol group, the hopping distance set may be {−3.75 kHz, −22.5 kHz}.

Figure 24:
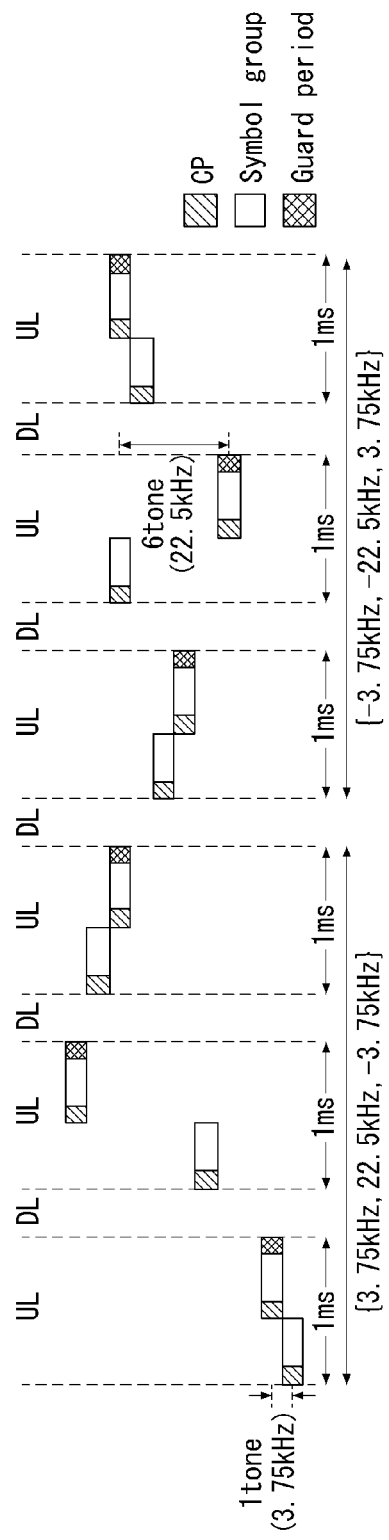

Further, FIG. 24 illustrates an example of preamble transmission based on a hopping distance set {+3.75 kHz, +22.5 kHz, −3.75 kHz} when the contiguous uplink subframes are 1 ms (i.e., when the L value is 1). In this case, when the sign is determined as negative (−) according to the subcarrier index of the first transmitted symbol group, the hopping distance set may be {−3.75 kHz, −22.5 kHz, +3.75 kHz}.

Figure 25:
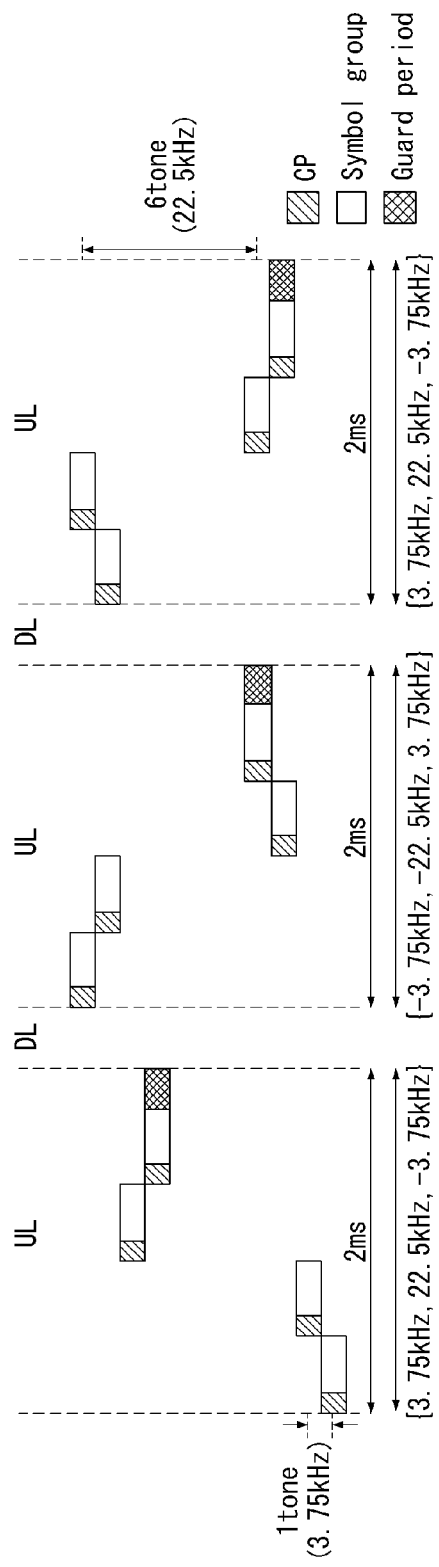

Further, FIG. 25 illustrates an example of preamble transmission based on a hopping distance set {+3.75 kHz, +22.5 kHz, −3.75 kHz} when the contiguous uplink subframes are 2 ms (i.e., when the L value is 2). In this case, when the sign is determined as negative (−) according to the subcarrier index of the first transmitted symbol group, the hopping distance set may be {−3.75 kHz, −22.5 kHz, +3.75 kHz}.

Figure 26:
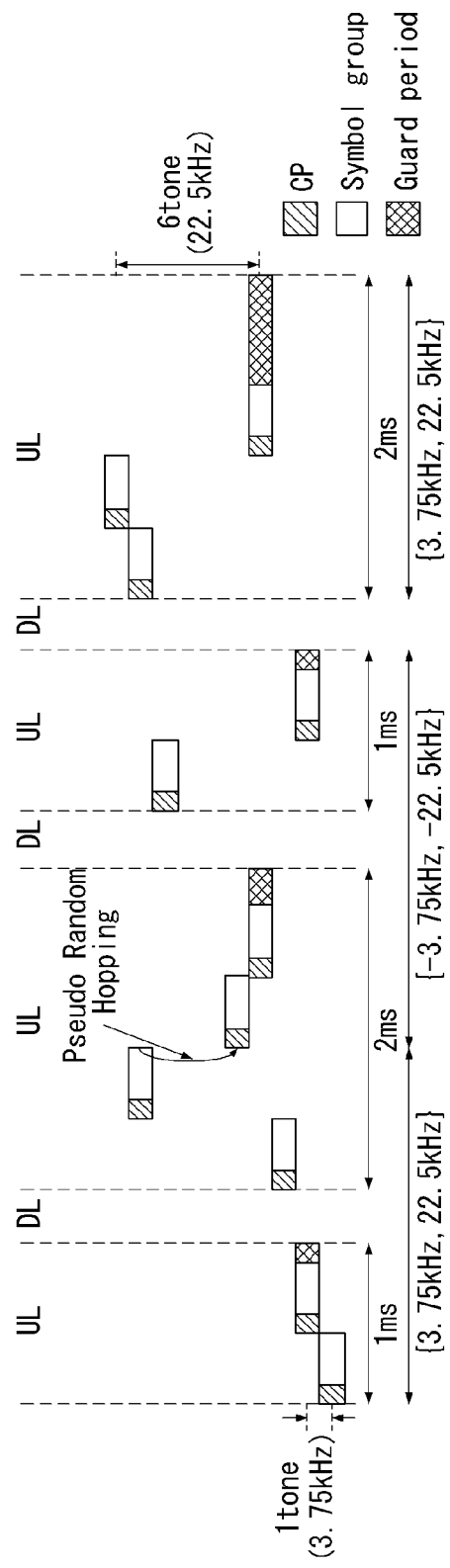

Further, FIG. 26 illustrates an example of preamble transmission based on the hopping distance set {+3.75 kHz, +22.5 kHz} when the contiguous uplink subframes are 1 ms or 2 ms (i.e., when the L value is 1 or 2). In this case, when the sign is determined as negative (−) according to the subcarrier index of the first transmitted symbol group, the hopping distance set may be {−3.75 kHz, −22.5 kHz}.

Figure 27:
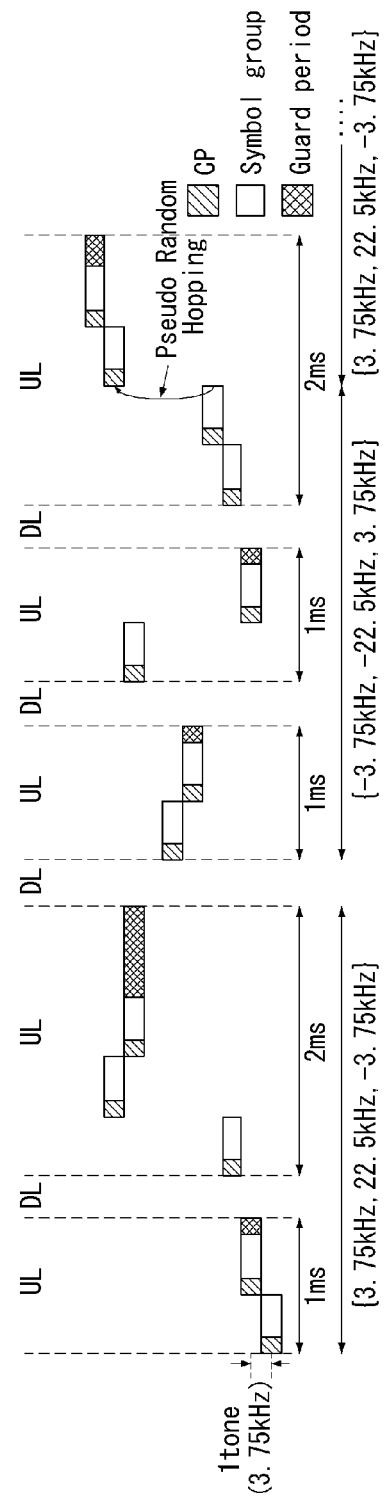

Further, FIG. 27 illustrates an example of preamble transmission based on the hopping distance set {+3.75 kHz, +22.5 kHz, −3.75 kHz} when the contiguous uplink subframes are 1 ms or 2 ms (i.e., when the L value is 1 or 2). In this case, when the sign is determined as negative (−) according to the subcarrier index of the first transmitted symbol group, the hopping distance set may be {−3.75 kHz, −22.5 kHz, +3.75 kHz}.

Figure 28:
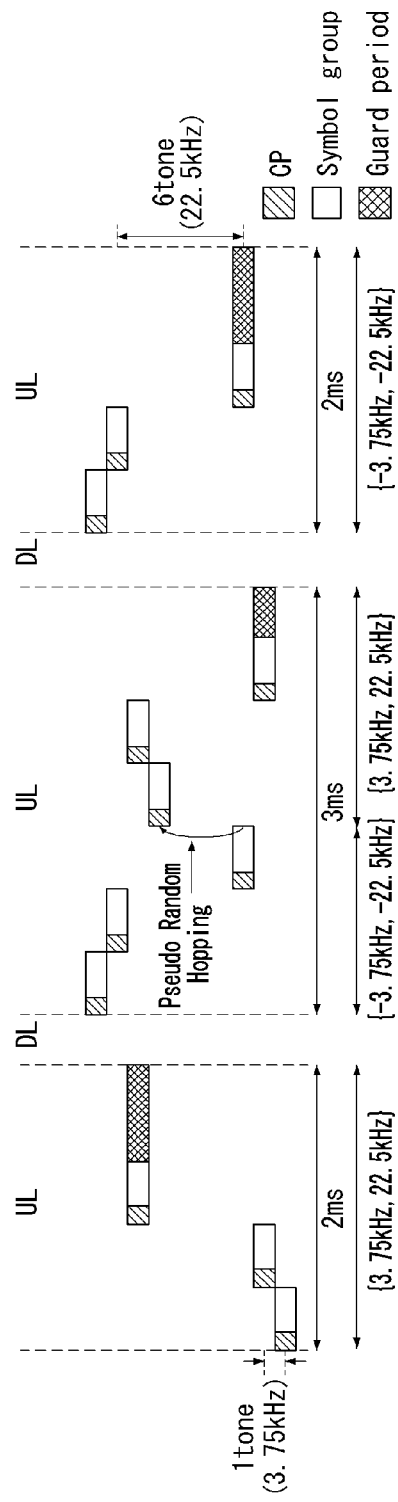

Further, FIG. 28 illustrates an example of preamble transmission based on the hopping distance set {+3.75 kHz, +22.5 kHz} when the contiguous uplink subframes are 2 ms or 3 ms (i.e., when the L value is 2 or 3). In this case, when the sign is determined as negative (−) according to the subcarrier index of the first transmitted symbol group, the hopping distance set may be {−3.75 kHz, −22.5 kHz}.

Figure 29:
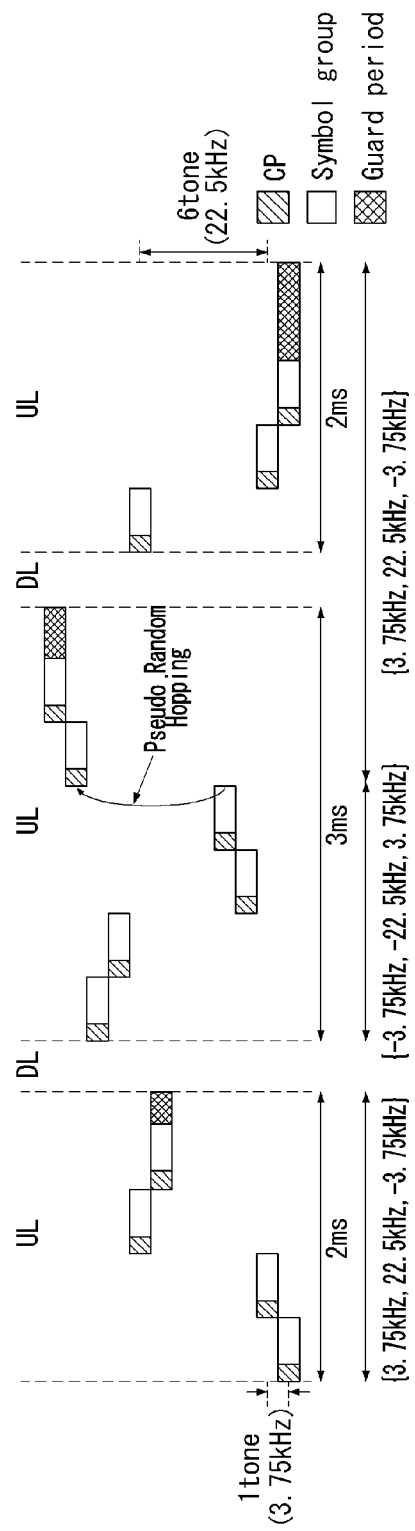

Further, FIG. 29 illustrates an example of preamble transmission based on the hopping distance set {+3.75 kHz, +22.5 kHz, −3.75 kHz} when the contiguous uplink subframes are 2 ms or 3 ms (i.e., when the L value is 2 or 3). In this case, when the sign is determined as negative (−) according to the subcarrier index of the first transmitted symbol group, the hopping distance set may be {−3.75 kHz, −22.5 kHz, +3.75 kHz}.

Figure 30:
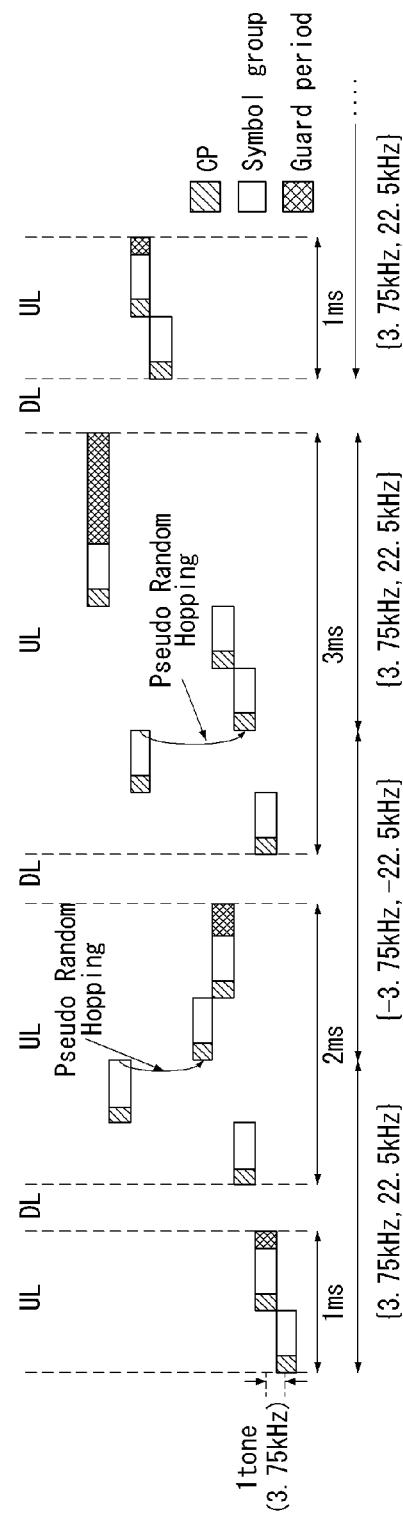

Further, FIG. 30 illustrates an example of preamble transmission based on the hopping distance set {+3.75 kHz, +22.5 kHz} when the contiguous uplink subframes are 1 ms, 2 ms, or 3 ms (i.e., when the L value is 1, 2, or 3). In this case, when the sign is determined as negative (−) according to the subcarrier index of the first transmitted symbol group, the hopping distance set may be {−3.75 kHz, −22.5 kHz}.

Figure 31:
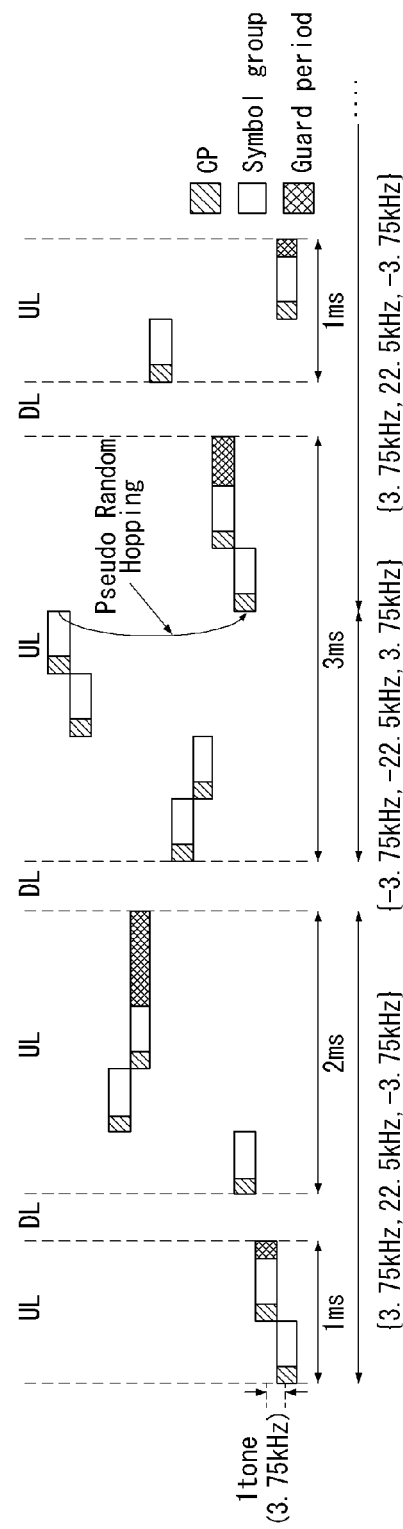

Further, FIG. 31 illustrates an example of preamble transmission based on the hopping distance set {+3.75 kHz, +22.5 kHz, −3.75 kHz} when the contiguous uplink subframes are 1 ms, 2 ms, or 3 ms (i.e., when the L value is 1, 2, or 3). In this case, when the sign is determined as negative (−) according to the subcarrier index of the first transmitted symbol group, the hopping distance set may be {−3.75 kHz, −22.5 kHz, +3.75 kHz}.

(Method 4)

Next, proposed is a method in which the NPRACH preamble format to be transmitted by the UE is predetermined by a configuration (e.g., a higher layer signaling) or the like and the hopping pattern is applied differently according to the number of contiguous uplink subframes when the UE actually transmits the NPRACH preamble format.

As an example, it is assumed that the NPRACH preamble format is a size in which two symbol groups may be transmitted back-to-back (i.e., contiguously) in the uplink subframe of 1 ms.

In this case, when the number of contiguous uplink subframes is 1, the UE may be configured to contiguously transmit two symbol groups having the hopping distance of +3.75 kHz or +22.5 kHz. When the sign is negative (−) according to the subcarrier index of the first transmitted symbol group, {−3.75 kHz, −22.5 kHz} may be configured as one hopping distance set. In this case, the NPRACH preamble (i.e., the NPRACH preamble format) may be constituted by a total of four symbol groups. That is, the NPRACH preamble may include a total of four symbol groups.

In this case, when the number of contiguous uplink subframes is 2, the UE may be configured to contiguously transmit four symbol groups having the hopping distances of +3.75 kHz, +22.5 kHz, and −3.75 kHz. When the sign is negative (−) according to the subcarrier index of the first transmitted symbol group, {−3.75 kHz, −22.5 kHz, +3.75 kHz} may be configured as one hopping distance set. Even in this case, the NPRACH preamble may include a total of four symbol groups. However, a difference from the case where the number of contiguous uplink subframes is 1 may be that four symbol groups are transmitted back-to-back when the number of contiguous uplink subframes is 2.

Further, when the number of contiguous uplink subframes is 2, the UE may be configured to contiguously transmit four symbol groups having the hopping distances of +3.75 kHz, +22.5 kHz, and −3.75 kHz and use the remaining region as the guard period. Alternatively, in this case, the UE may be configured to continuously transmit six symbol groups with five hopping distances, such as +3.75 kHz, +22.5 kHz, −3.75 kHz, −22.5 kHz, and +3.75 kHz. In this case, when the sign is negative (−) according to the subcarrier index of the first transmitted symbol group, {−3.75 kHz, −22.5 kHz, +3.75 kHz, +22.5 kHz, −3.75 kHz} may be configured as one hopping distance set.

Combinations of the hopping distances are just examples and even when other combinations other than the proposed combination, the operation may be similarly applied, of course.

Further, when the above-described configuration is considered, an additional operation may need to be considered when the contiguous uplink subframes appear irregularly. For example, when there is one contiguous uplink subframe, the operation may be performed as described above when one uplink subframe contiguously appears an even number of times at an interval of 5 ms or 10 ms. However, when one corresponding uplink subframe exists between two contiguous uplink subframes or three contiguous uplink subframes, the UE may be configured not to transmit the preamble in one uplink subframe but to postpone the transmission. Alternatively, when one corresponding uplink subframe appears an odd number of times at the interval of 5 ms or 10 ms, the UE may be configured not to transmit in one predetermined uplink subframe but to postpone the transmission. Here, one predetermined uplink subframe may be a first or last subframe.

In addition, since the number of symbols to be actually transmitted may be different according to the NPRACH preamble format, a signal to noise ratio (SNR) gain may be changed in the case of the same repetition number when the preamble is received at the base station. Therefore, considering NPRACH preamble formats for TDD applications newly proposed in this specification, the maximum repetition number may be newly defined.

That is, the maximum repetition number may be set so that the preamble format having the smallest number of symbols actually transmitted may achieve similar performance to the existing FDD by comparing the preamble formats to be newly introduced in the next generation communication system. For example, a method may be considered, in which when the number of symbols actually transmitted in the preamble format for the existing FDD is S times as many as the number of symbols actually transmitted in the preamble format to be newly introduced, the maximum repetition number is set to 128*S which is S times of 128 as the existing number, an integer equal to or larger than 128*S, or a value of an exponential power (i.e., 2 k) of 2 which is the smallest while being equal to or larger than 128*S.

To describe a specific example of one of the above-mentioned examples, it is assumed that 20 (i.e., 5×4) symbols are transmitted in the existing preamble format and four symbols are transmitted in the preamble format to be newly introduced. In this case, since the difference is five times, the maximum repetition number may be set to 1024, which is equal to or larger than 640 (i.e., 128*5) and which is an exponential power of 2 which is the smallest. That is, the repetition number set may be changed to {1, 2, 4, 8, 16, 32, 64, 128, 256, 512, 1024} for the preamble format to be newly introduced.

By a different method therefrom, when the preamble to be newly introduced is configured without changing the maximum repetition number set in the existing FDD, the UE may be configured to reinterpret the repetition number. For example, when the number of symbols actually transmitted in the preamble format for the existing FDD application is S times larger than the number of symbols actually transmitted in the preamble format to be newly introduced, the UE may be configured to recognize the repetition number as Nrep*S which is S times the set repetition number, the integer equal to larger than 128*S, or the value which is equal to or larger than 128*S and which is the exponential power of 2 which is the smallest and repeatedly transmit the preamble.

To describe a specific example of one of the above-mentioned examples, it is assumed that 20 (i.e., 5×4) symbols are transmitted in the existing preamble format and four symbols are transmitted in the preamble format to be newly introduced. In this case, since the difference is five times, when the maximum repetition number set in the UE may be 32, the UE may be configured to interpret the repetition number as 256 which is equal to or larger than 160 (32*5) and which is the exponential power of 2 which is the smallest and transmit the preamble.

The method described above may be extended and applied to all of the methods (i.e., methods 1, 2, 3, and/or 4) described hereinabove.

Further, a method may be considered, which configures a new format by changing only the number (i.e., N) of symbols in the symbol group while using the CP length proposed in the specific preamble format (e.g., preamble format 1) mentioned above in each of methods 1 and 2. For example, in method 1 described above, a new format may be configured to be configured while selecting a value equal to or smaller than 1527 Ts as the CP length and changing the N value to 1, 2, 3, etc. Similarly, in method 2 described above, the new format may be configured to be configured while selecting a value equal to or smaller than 4827 Ts as the CP length and changing the N value to 1, 2, 3, 4, etc. In this case, the cell coverage supported by different formats sharing the same generated CP length is similar, but there may be a difference in SNR gain when receiving the preamble at the base station as the number of actually transmitted symbols increases.

Overview of Devices to Which Present Invention is Applicable

FIG. 32 illustrates a block diagram of a wireless communication device to which methods proposed in this specification may be applied.

Referring to FIG. 32, a wireless communication system includes a base station 3210 and multiple user equipments 3220 positioned within an area of the base station.

Each of the base station and the UE may be expressed as a wireless device.

The base station 3210 includes a processor 3211, a memory 3212, and a radio frequency (RF) module 3213. The processor 3211 implements a function, a process, and/or a method which are proposed in FIGS. 1 to 31 above. Layers of a radio interface protocol may be implemented by the processor. The memory 3212 is connected with the processor to store various information for driving the processor. The RF module 3213 is connected with the processor to transmit and/or receive a radio signal.

The UE includes a processor 3221, a memory 3222, and an RF module 3223.

The processor implements a function, a process, and/or a method which are proposed in FIGS. 1 to 31 above. Layers of a radio interface protocol may be implemented by the processor. The memory is connected with the processor to store various information for driving the processor. The RF module 3223 is connected with the processor to transmit and/or receive a radio signal.

The memories 3212 and 3222 may be positioned inside or outside the processors 3211 and 3221 and connected with the processor by various well-known means.

Further, the base station and/or the UE may have a single antenna or multiple antennas.

FIG. 33 illustrates a block diagram of a communication device according to an embodiment of the present invention.

In particular, FIG. 33 is a diagram more specifically illustrating the UE of FIG. 32 above.

Referring to FIG. 33, the UE may be configured to include a processor (or a digital signal processor (DSP)) 3310, an RF module (or RF unit) 3335, a power management module 3305, an antenna 3340, a battery 3355, a display 3315, a keypad 3320, a memory 3330, a subscriber identification module (SIM) card 3325 (this component is optional), a speaker 3345, and a microphone 3350. The UE may also include a single antenna or multiple antennas.

The processor 3310 implements a function, a process, and/or a method which are proposed in FIGS. 1 to 31 above. Layers of a radio interface protocol may be implemented by the processor.

The memory 3330 is connected with the processor and stores information related with an operation of the processor.

The memory 3330 may be positioned inside or outside the processor and connected with the processor by various well-known means.

A user inputs command information such as a telephone number or the like by, for example, pressing (or touching) a button on the keypad 3320 or by voice activation using the microphone 3350. The processor receives such command information and processes to perform appropriate functions including dialing a telephone number. Operational data may be extracted from the SIM card 3325 or the memory 3330. In addition, the processor may display command information or drive information on the display 3315 for the user to recognize and for convenience.

The RF module 3335 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 3340 functions to transmit and receive the radio signals. Upon receiving the radio signals, the RF module may transfer the signal for processing by the processor and convert the signal to a baseband. The processed signal may be converted into to audible or readable information output via the speaker 3345.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

What is claimed is:

1. A method of transmitting, by a user equipment, a narrowband physical random access channel (NPRACH) preamble in a narrowband-Internet of things (NB-IoT) system, the method comprising:
   receiving, from a base station (BS), configuration information for an uplink-downlink configuration; and
   transmitting, to the BS, the NPRACH preamble based on the uplink-downlink configuration,
   wherein the NPRACH preamble is based on two symbol group sets,
   wherein each symbol group set includes three time-contiguous symbol groups,
   wherein each symbol group includes a cyclic prefix and a sequence of one symbol, and
   wherein a length of a symbol group set which includes three time-contiguous symbol groups is configured to be shorter than a subframe.

2. The method of claim 1, wherein a length of the sequence of one symbol is $8192T_s$ and a length of the subframe is 1 ms.

3. The method of claim 2, wherein a value of the $T_s$ is $1/(30.72)$ µs.

4. The method of claim 3, wherein symbol groups are transmitted through frequency hopping.

5. The method of claim 1, wherein the uplink-downlink configuration is configured based on frame structure type 2 related to the time division duplexing.

6. The method of claim 1, wherein the number of symbol group sets included in the NPRACH preamble, the number of symbol groups included in the symbol group set, and the number of symbols included in the symbol group are configured differently according to the uplink-downlink configuration supported by the BS.

7. A method of receiving, by a base station, a narrowband physical random access channel (NPRACH) preamble in a narrowband-Internet of things (NB-IoT) system, the method comprising:
   transmitting, to a user equipment (UE), configuration information for an uplink-downlink configuration; and
   receiving, from the UE, the NPRACH preamble based on the uplink-downlink configuration,
   wherein the NPRACH preamble is based on two symbol group sets,
   wherein each symbol group set includes three time-contiguous symbol groups,
   wherein each symbol group includes a cyclic prefix and a sequence of one symbol, and
   wherein a length of a symbol group set which includes three time-contiguous symbol groups is configured to be shorter than a subframe.

8. The method of claim 7, wherein a length of the sequence of one symbol is $8192T_s$ and a length of the subframe is 1 ms.

9. The method of claim 8, wherein a value of the $T_s$ is $1/(30.72)$ µs.

10. The method of claim 9, wherein symbol groups are transmitted through frequency hopping.

11. The method of claim 7, wherein the uplink-downlink configuration is configured based on frame structure type 2 related to the time division duplexing.

12. A user equipment (UE) configured to transmit a narrowband physical random access channel (NPRACH) preamble in a narrowband-Internet of things (NB-IoT) system, the UE comprising:
   at least one transceiver;
   at least one processor; and at least one memory operably connectable to the at least one processor and storing instructions that, based on being executed by the at least one processor, perform operations comprising:
receiving, from a base station (BS), configuration information for an uplink-downlink configuration, and
transmitting, to the BS, the NPRACH preamble based on the uplink-downlink configuration,
wherein the NPRACH preamble is based on two symbol group sets,
wherein each symbol group set includes three time-contiguous symbol groups,
wherein each symbol group includes a cyclic prefix and a sequence of one symbol, and
wherein a length of a symbol group set which includes three time-contiguous symbol groups is configured to be shorter than a subframe.

13. The UE of claim 12, wherein a length of the sequence of one symbol is $8192T_s$ and a length of the subframe is 1 ms.

14. The UE of claim 13, wherein a value of the $T_s$ is $1/(30.72)$ µs.

15. The UE of claim 14, wherein symbol groups are transmitted through frequency hopping.

16. The UE of claim 12, wherein the uplink-downlink configuration is configured based on frame structure type 2 related to the time division duplexing.

17. The UE of claim 12, wherein the number of symbol group sets included in the NPRACH preamble, the number of symbol groups included in the symbol group set, and the number of symbols included in the symbol group are configured differently according to the uplink-downlink configuration supported by the BS.

* * * * *